(12) United States Patent
Motoyama et al.

(10) Patent No.: US 11,373,418 B2
(45) Date of Patent: Jun. 28, 2022

(54) INFORMATION PROCESSING APPARATUS, INFORMATION PROCESSING METHOD, PROGRAM, AND MOBILE OBJECT

(71) Applicant: Sony Corporation, Tokyo (JP)

(72) Inventors: Takuto Motoyama, Tokyo (JP); Hideki Oyaizu, Tokyo (JP); Yasuhiro Sutou, Kanagawa (JP); Toshio Yamazaki, Tokyo (JP); Kentaro Doba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 249 days.

(21) Appl. No.: 16/634,580

(22) PCT Filed: Jul. 25, 2018

(86) PCT No.: PCT/JP2018/027840
§ 371 (c)(1),
(2) Date: Jan. 28, 2020

(87) PCT Pub. No.: WO2019/026714
PCT Pub. Date: Feb. 7, 2019

(65) Prior Publication Data
US 2020/0272834 A1    Aug. 27, 2020

(30) Foreign Application Priority Data

Aug. 4, 2017    (JP) .............................. JP2017-151476

(51) Int. Cl.
*G06V 20/56*    (2022.01)
*G06T 7/10*    (2017.01)
(Continued)

(52) U.S. Cl.
CPC .............. *G06V 20/588* (2022.01); *G06T 7/10* (2017.01); *G06T 7/20* (2013.01); *G06T 7/50* (2017.01);
(Continued)

(58) Field of Classification Search
USPC .................................................. 382/104, 103
See application file for complete search history.

(56) References Cited

U.S. PATENT DOCUMENTS 8,184,194 B2 *  5/2012  Sato ...................... G02B 27/283
                                                       348/335
9,025,027 B2 *  5/2015  Xue ....................... G01J 3/0229
                                                       348/148
(Continued)

FOREIGN PATENT DOCUMENTS

EP          3113150 A1      1/2017
JP       2007-264998 A     10/2007
(Continued)

OTHER PUBLICATIONS

International Search Report and Written Opinion dated Oct. 23, 2018 for PCT/JP2018/027840 filed on Jul. 25, 2018, 6 pages including English Translation of the International Search Report.
(Continued)

*Primary Examiner* — Ishrat I Sherali
(74) *Attorney, Agent, or Firm* — Xsensus LLP

(57) ABSTRACT

An information processing apparatus capable of detecting a plane constituting a movement-enabling region. A normal direction of a plane constituting a road surface is detected on the basis of polarized images in multiple polarizing directions acquired by a polarization camera. A laser ranging sensor measures a distance to a point on the road surface so as to measure a position of the point. The plane constituting the road surface is identified on the basis of information regarding the normal direction of the plane constituting the road surface and information regarding the position of the point on the road surface.

13 Claims, 13 Drawing Sheets

(51) Int. Cl.
G06T 7/50 (2017.01)
G06T 7/70 (2017.01)
G06T 7/20 (2017.01)

(52) U.S. Cl.
CPC ...... G06T 7/70 (2017.01); *G06T 2207/10028* (2013.01); *G06T 2207/30252* (2013.01)

(56) References Cited

U.S. PATENT DOCUMENTS

| | | | |
|---|---|---|---|
| 9,317,754 B2* | 4/2016 | Hirai | G06T 7/11 |
| 9,778,029 B2* | 10/2017 | Yamaguchi | G01B 11/002 |
| 10,591,594 B2* | 3/2020 | Oyaizu | G01C 3/085 |
| 10,769,951 B2* | 9/2020 | Hirasawa | G06T 7/11 |
| 10,812,735 B2* | 10/2020 | Hirasawa | H04N 5/217 |
| 2011/0026833 A1* | 2/2011 | Sugino | G06K 9/00664 |
| | | | 382/201 |
| 2012/0268602 A1* | 10/2012 | Hirai | G06K 9/00798 |
| | | | 348/148 |
| 2017/0018087 A1* | 1/2017 | Yamaguchi | G06T 7/73 |
| 2018/0284260 A1* | 10/2018 | Oyaizu | G01S 13/931 |
| 2018/0301032 A1* | 10/2018 | Hirasawa | G06T 7/11 |

FOREIGN PATENT DOCUMENTS

| | | |
|---|---|---|
| JP | 2015-114307 A | 6/2015 |
| JP | 2015-170127 A | 9/2015 |
| JP | 2017-501474 A | 1/2017 |
| WO | 2017/056822 A1 | 4/2017 |
| WO | 2017/057058 A1 | 4/2017 |

OTHER PUBLICATIONS

Extended European search report dated Jul. 14, 2020, in corresponding to European patent Application No. 18841153.2, 9 pages.

* cited by examiner

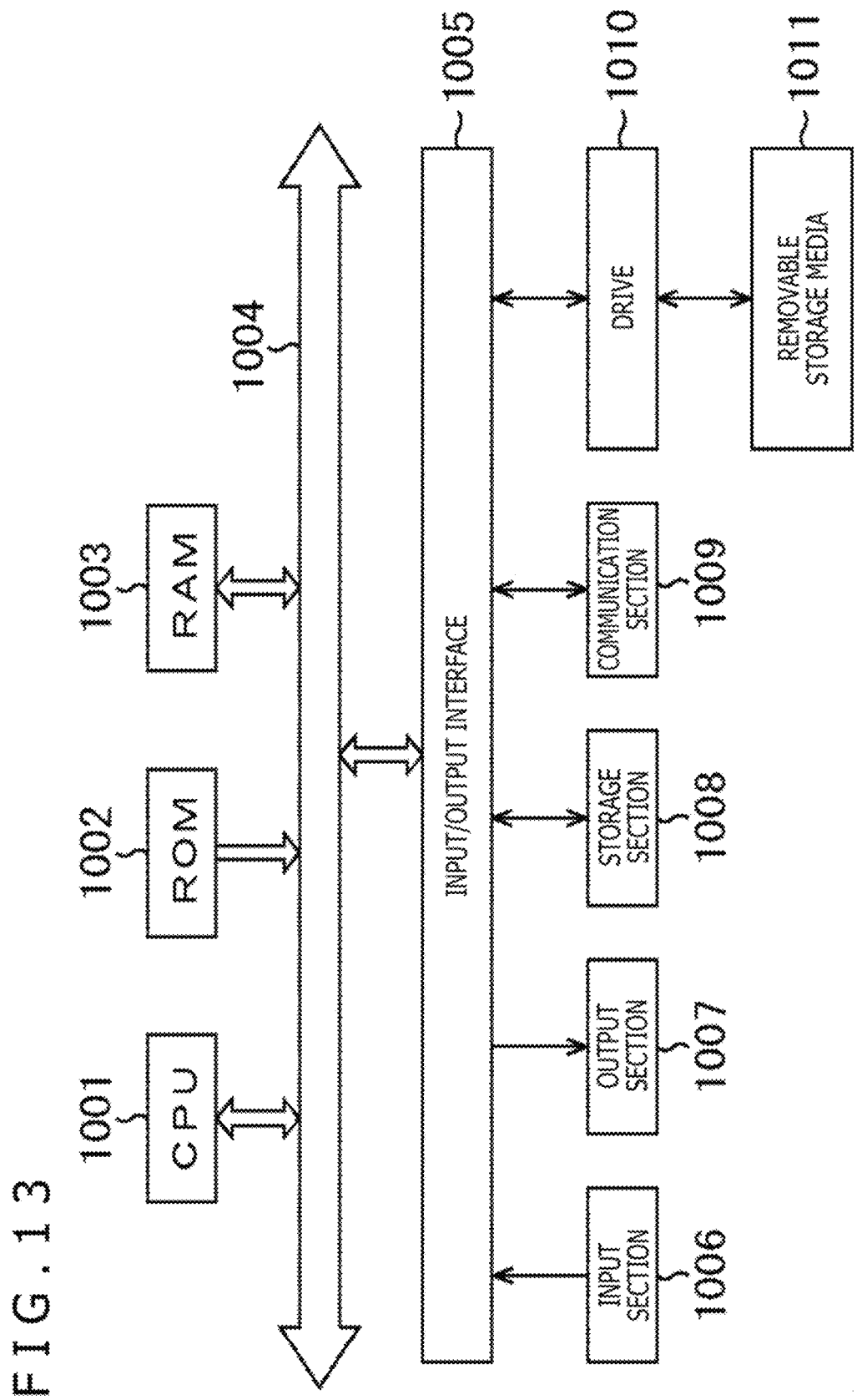

INFORMATION PROCESSING APPARATUS, INFORMATION PROCESSING METHOD, PROGRAM, AND MOBILE OBJECT

CROSS-REFERENCE TO RELATED APPLICATIONS

The present application is based on PCT filing PCT/JP2018/027840, filed Jul. 25, 2018, which claims priority to JP 2017-151476, filed Aug. 4, 2017, the entire contents of each are incorporated herein by reference.

TECHNICAL FIELD

The present disclosure relates to an information processing apparatus, an information processing method, a program, and a mobile object. More particularly, the disclosure relates to an information processing apparatus capable of detecting a plane constituting a movement-enabling region, as well as to an information processing method, a program, and a mobile object.

BACKGROUND ART

In order to implement autonomous movement of a mobile object, it is necessary for the mobile object to recognize the position of the self. Achieving this requires first recognizing the state of the surroundings of the self, generating a local map therefrom, and estimating the self-position accordingly.

There has been proposed a technique in which polarized images are acquired and normal vectors are estimated from the acquired polarized images before the normal vectors are integrated with a depth map so as to improve the accuracy of the depth map (see PTL 1). This technique may conceivably be applied to the recognition of objects from information regarding the normal directions obtained from the polarized images for use in generating the local map.

CITATION LIST

Patent Literature

[PTL 1]
Japanese Patent Laid-open No. 2015-114307

SUMMARY

Technical Problem

However, since the normal direction information obtained from the polarized images is not three-dimensional information, objects in the images can be recognized but the distances to these objects cannot be recognized. This makes it impossible to directly generate a local map.

The present disclosure has been made in view of the above circumstances. One particular object of the present disclosure is to provide means for generating a local map by recognizing a plane in a three-dimensional space constituting a movement-enabling region on the basis of normal direction information obtained from polarized images.

Solution to Problem

According to one aspect of the present disclosure, there is provided an information processing apparatus including: a movement-enabling region normal line detection section configured to detect a normal direction of a plane constituting a movement-enabling region for a mobile object; a position identification section configured to identify a position of a point on the plane constituting the movement-enabling region; and a plane identification section configured to identify the plane constituting the movement-enabling region on the basis of the normal direction of the movement-enabling region and the position of the point in the movement-enabling region.

The information processing apparatus may further include a polarization camera configured to acquire polarized images in multiple polarizing directions. The movement-enabling region normal line detection section may detect, on the basis of the polarized images, the normal direction of the plane constituting the movement-enabling region for the mobile object.

The information processing apparatus may further include: a normal direction detection section configured to detect, in units of pixels, the normal direction of a surface of a subject in the polarized images before outputting the detected normal direction as a normal vector map; a reconstruction section configured to reconstruct an unpolarized image from the multiple polarized images; and an attribute setting section configured to set an attribute of the subject to each of the pixels in the unpolarized image. The movement-enabling region normal line detection section may detect a dominant normal direction on the normal vector map corresponding to a region having those pixels in the unpolarized image of which the attribute is set to the movement-enabling region by the attribute setting section, the dominant normal direction being the normal direction of the plane constituting the movement-enabling region.

The attribute setting section may set, through semantic segmentation, the attribute of the subject to each of the pixels in the unpolarized image.

The information processing apparatus may further include an environmental mapping section configured to generate an environmental map on the basis of information regarding the attribute of the subject set to each of the pixels in the unpolarized image and information regarding the plane identified by the plane identification section.

Given the information regarding the attribute of the subject set to each of the pixels in the unpolarized image, the environmental mapping section may generate the environmental map on the basis of information regarding the pixels of which the attribute is set to the movement-enabling region and information regarding the pixels of which the attribute is set to an obstacle, the environmental map being indicative of the position of the obstacle on the plane constituting the movement-enabling region.

Given the information regarding the attribute of the subject set to each of the pixels in the unpolarized image, the environmental mapping section may generate the environmental map by taking the position on the plane constituting the movement-enabling region and corresponding to a boundary pixel in a vertically downward direction between the region of the pixels of which the attribute is set to the movement-enabling region on one hand and the region of the pixels of which the attribute is set to the obstacle on the other hand, as the position of the obstacle on the plane constituting the movement-enabling region.

The environmental map may be an occupancy grid map (Occupancy Grid Map).

The information processing apparatus may further include a coordinate system integration section configured to integrate a coordinate system indicative of a position of a point identified by the position identification section in the movement-enabling region with a coordinate system of the polarized images acquired by the polarization camera.

The information processing apparatus may further include a ranging section configured to measure the distance to the point in the movement-enabling region. The position identification section may identify the position of the point in the movement-enabling region on the basis of the distance, measured by the ranging section, to the point in the movement-enabling region.

The ranging section may be a laser ranging sensor, a stereo camera, or a millimeter-wave radar.

The movement-enabling region may be a road surface.

Also according to one aspect of the present disclosure, there is provided an information processing method including the steps of: detecting, on the basis of a polarized image, a normal direction of a plane constituting a movement-enabling region for a mobile object; identifying a position of a point in the movement-enabling region; and identifying the plane constituting the movement-enabling region on the basis of the normal direction of the movement-enabling region and the position of the point in the movement-enabling region.

Also according to one aspect of the present disclosure, there is provided a program for causing a computer to execute a process including: a movement-enabling region normal line detection section configured to detect, on the basis of a polarized image, a normal direction of a plane constituting a movement-enabling region for a mobile object; a position identification section configured to identify a position of a point on the plane constituting the movement-enabling region; and a plane identification section configured to identify the plane constituting the movement-enabling region on the basis of the normal direction of the movement-enabling region and the position of the point in the movement-enabling region.

Also according to one aspect of the present disclosure, there is provided a mobile object including a movement-enabling region normal line detection section configured to detect, on the basis of a polarized image, a normal direction of a plane constituting a movement-enabling region for a mobile object; a position identification section configured to identify a position of a point on the plane constituting the movement-enabling region; a plane identification section configured to identify the plane constituting the movement-enabling region on the basis of the normal direction of the movement-enabling region and the position of the point in the movement-enabling region; an environmental mapping section configured to generate an environmental map on the basis of the plane identified by the plane identification section; a planning section configured to plan a movement route on the basis of the environmental map generated by the environmental mapping section, and a control section configured to control an action of the mobile object on the basis of the movement route planned by the planning section.

Thus, according to one aspect of the present disclosure, a normal direction of a plane constituting a movement-enabling region for a mobile object is detected on the basis of polarized images. A position of a point on the plane constituting the movement-enabling region is identified. The plane constituting the movement-enabling region is then identified on the basis of the normal direction of the movement-enabling region and the position of the point in the movement-enabling region.

Advantageous Effect of Invention

According to one aspect of the present disclosure, it is particularly possible to recognize a plane constituting a movement-enabling region on the basis of normal direction information obtained from polarized images to thereby generate a local map.

BRIEF DESCRIPTION OF DRAWINGS

FIG. 13 is a view explaining an exemplary configuration of a general-purpose computer.

DESCRIPTION OF EMBODIMENT

One preferred embodiment of the present disclosure is described below in detail with reference to the accompanying drawings. Throughout the ensuing description and the drawings, the constituent elements having substantially identical functions and configurations are referred to by identical reference signs, and their redundant explanation is not repeated.

One preferred embodiment for implementing the present technology is described below. The description will be given in the following order.

1. Preferred embodiment of present disclosure
2. Examples of process execution by software 1. Preferred Embodiment of Present Disclosure

[Overview of Present Disclosure]

The mobile object of the present disclosure is a mobile object that generates a local map required for autonomous movement.

Figure 1:
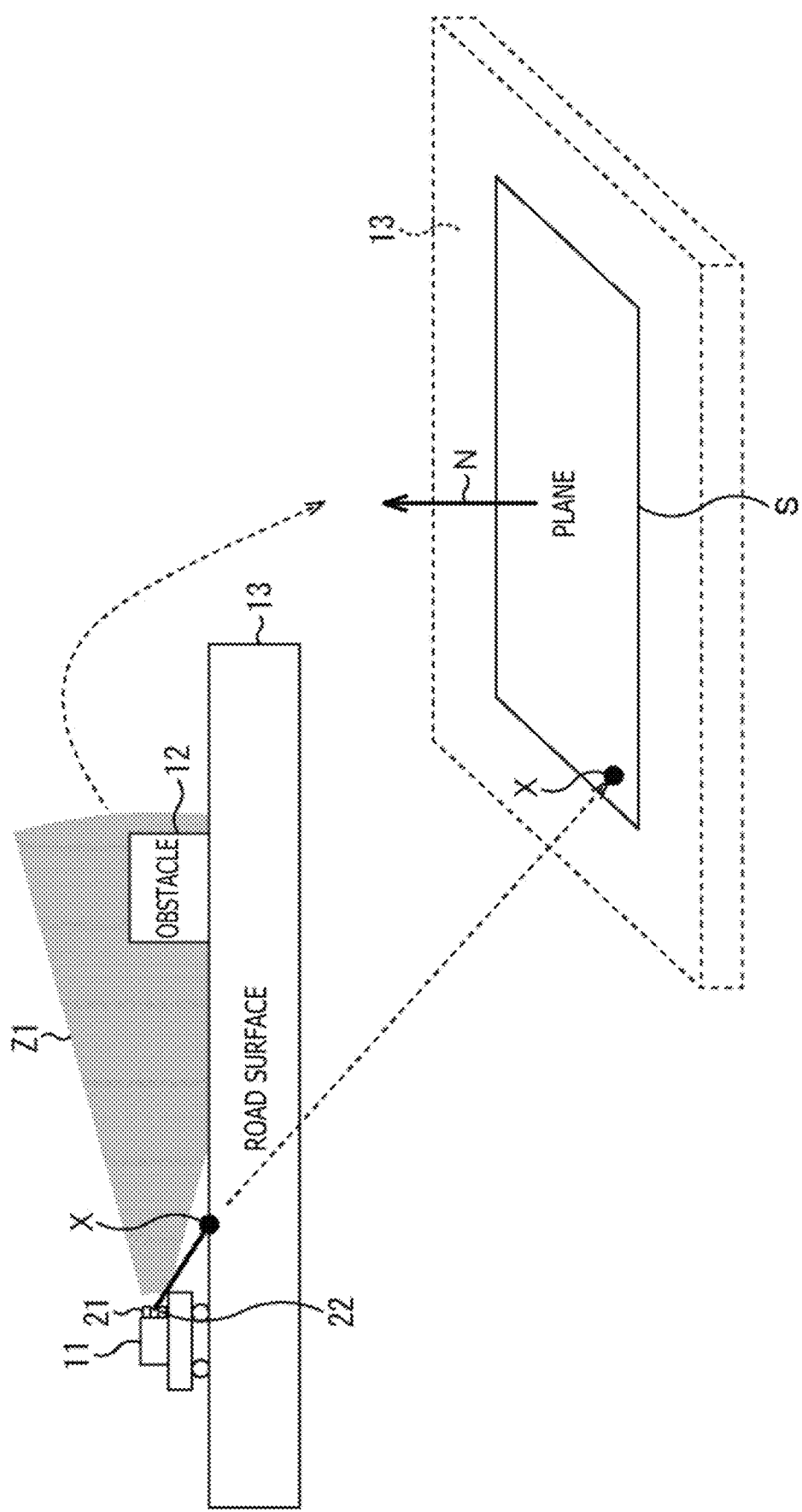
FIG. 1 is a view explaining the principle for identifying a plane constituting a road surface according to the present disclosure.

Outlined hereunder is how a mobile object 11 of the present disclosure identifies a plane S in a three-dimensional space constituting a road surface so as to generate an environmental map on the basis of information regarding the identified plane S. FIG. 1 illustrates the mobile object 11 as it advances on a road surface 13 in a rightward direction as seen in the drawing, for example. In FIG. 1, there is an obstacle 12 on the road surface 13 ahead of the advancing direction of the mobile object 11.

As depicted in the left part of FIG. 1, the mobile object 11 includes a polarization camera 21 and a laser ranging sensor 22.

The polarization camera 21 acquires polarized images with a field angle Z1 in multiple polarizing directions of the front in the advancing direction of the mobile object 11.

On the basis of the polarized images in multiple polarized directions acquired by the polarization camera 21, the mobile object 11 detects a normal direction (normal vector) N (nx, ny, nz) of the plane S constituting the road surface 13, as depicted in the right part of FIG. 1. Incidentally, reference is solicited to PTL 1 for the principle for detecting the normal direction.

The laser ranging sensor 22 measures the distance from the mobile object 11 in its advancing direction to the road surface 13 using the ToF (Time of Flight) method. The distance to the road surface 13 is obtained, for example, by measuring the time period from the time when laser light is projected to the road surface 13 until the time when reflected light from a point X on the road surface 13 is received.

The position measured by the laser ranging sensor 22 is a distance to that position on the road surface 13 of which the direction from the mobile object 11 is identified beforehand. It follows that once the distance is obtained, the position of the point X (x, y, z) on the plane S is measured.

The plane S constituting the road surface 13 is then identified from the normal direction N (nx, ny, nz) of the plane S and from the point X (x, y, z) on the plane S.

In other words, the equation of the plane S is defined as the following mathematical expression (1):

[Math. 1]

$$N^T X + d = 0 \quad (1)$$

$$N = \begin{bmatrix} n_x \\ n_y \\ n_z \end{bmatrix} : \text{normal vector}$$

$$x = \begin{bmatrix} x \\ y \\ z \end{bmatrix} : \text{three-dimensional point coordinates}$$

$d$: coefficient

In the above equation, X stands for the coordinates X measured on the plane S by the laser ranging sensor 22, N for the normal vector of the plane S, T for transposition, and d for a coefficient.

In other words, the coefficient d is obtained by solving the above equation (1) with the normal vector N of the plane S and the coordinate position X input thereto. The acquired coefficient d is then used to identify the plane S.

As a result, the plane of the road surface 13 constituted by the plane S is identified.

<Generation of Local Map Using Plane Constituting Road Surface>

Figure 2:
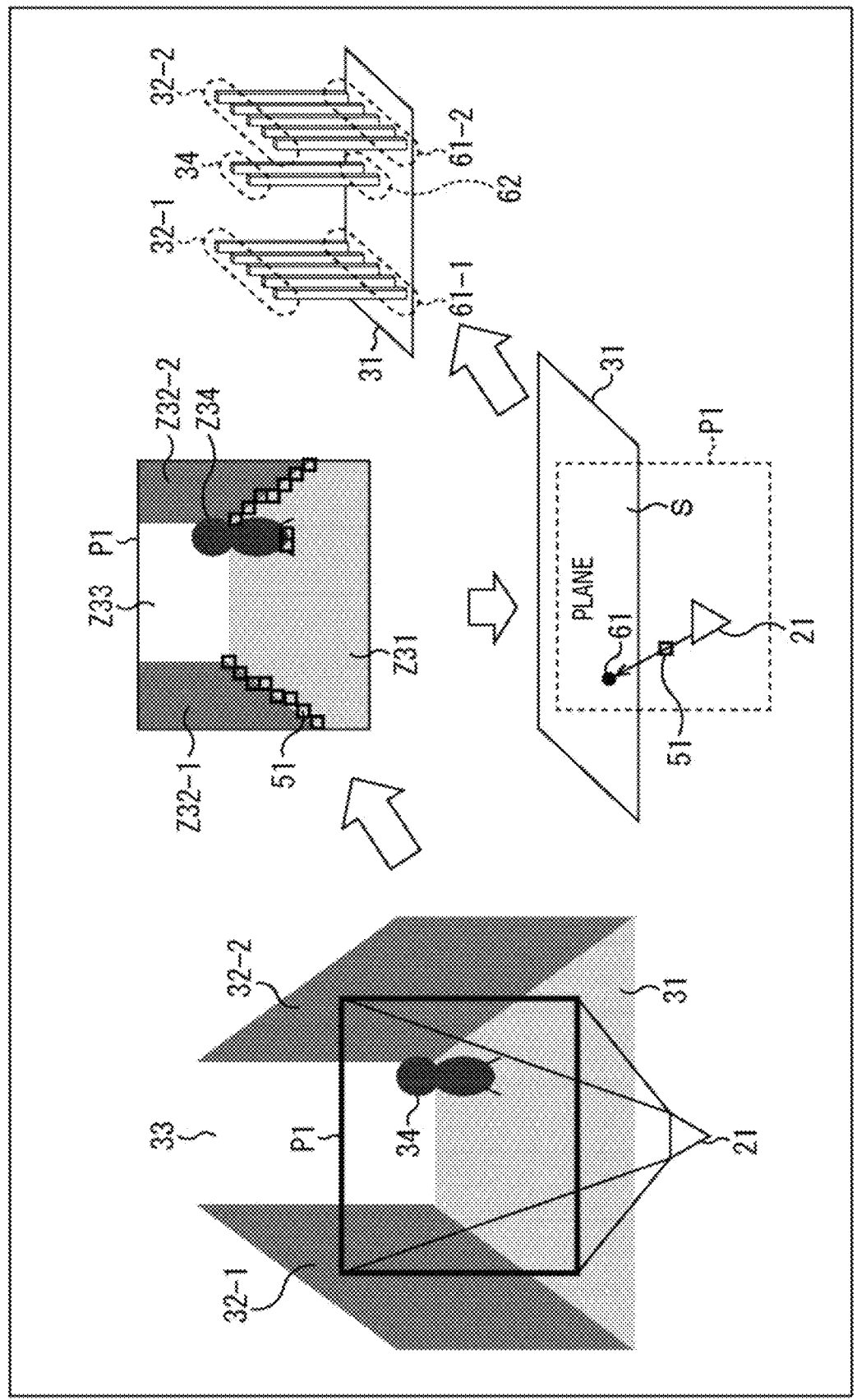
FIG. 2 is a view explaining a method of generating an environmental map based on the plane constituting the road surface.

Explained next with reference to FIG. 2 is the generation of a local map (environmental map to be discussed later) by use of the plane constituting the road surface.

For example, suppose that, as depicted in the left part of FIG. 2, the polarization camera 21 acquires an image P1 with the field angle Z1 from a composition in which a person 34 is on a road surface 31 in a space flanked left and right by three-dimensional structures 32-1 and 32-2 against the background of a sky 33 being visible.

Whereas the polarization camera 21 acquires images in multiple polarizing directions, the image P1 in the left part of FIG. 2 is an ordinary unpolarized image reconstructed from averaging the images in the multiple polarizing directions.

The types of subjects in the image P can be identified in units of pixels by semantic segmentation techniques including machine learning such as deep learning to be discussed later.

Thus, in the case of the image P1 depicted in the left part of FIG. 2, as depicted in the top center of FIG. 2, the pixels in the image P1 are categorized by semantic segmentation as follows: The pixels belonging to a zone Z31 in the lower part of the image P1 represent the road surface 31; the pixels belonging to zones Z32-1 and Z32-2 represent the left and right three-dimensional structures 32-1 and 32-2, respectively; the pixels belonging to a zone Z33 represent the sky 33 up in the background; and the pixels belonging to a zone Z34 represent the person 34.

Because the image P1 is a two-dimensional image, the position of each pixel in the three-dimensional space cannot be recognized.

However, in the case of the road surface 31, as with the road surface 13 in FIG. 1, the plane S constituting the road surface 31 can be identified by measuring the distance to a predetermined point on the road surface 31 using the laser ranging sensor 22. Thus, the coordinates of each of the pixels in the zone Z31 of the image P1 can be identified on the plane S constituting the corresponding road surface 31.

On the other hand, in the case of the obstacles to the mobile object 11 such as the three-dimensional structures 32-1 and 32-2 as well as the person 34, which are assumed to stand on the road surface 31, the boundaries in the image P1 between each of the zones Z32-1 and Z32-2 of the three-dimensional structures 32-1 and 32-2 and the zone Z34 of the person 34 on one hand and the zone Z31 of the road surface 31 in the vertically downward direction on the other hand may be considered to represent the very positions of the road surface 31 on which the three-dimensional structures 32-1 and 32-2 as well as the person 34 stand.

Consider here, as indicated by square cells in the image P1 in the top center of FIG. 2, boundary pixels 51 between the zone Z31 of the road surface in the image P1 on one hand and the zones Z32-1 and Z32-2 of the three-dimensional structures 32-1 and 32-2 and the zone Z34 of the person 34 in the vertically downward direction on the other hand.

It may then be considered that the boundary pixels 51 belonging to the boundary between the zone Z31 of the road surface 31 on one hand and the zones Z32-1 and Z32-2 of the three-dimensional structures 32-1 and 32-2 and the zone Z34 of the person 34 on the other hand have the same position on the plane S.

Thus, as depicted in the bottom center of FIG. 2, the boundary pixel 51 and an intersection point 61 on the plane S along the same line of sight are associated with each other. The association makes it possible to identify the positions, on the plane S constituting the road surface, of the obstacles such as the three-dimensional structures 32-1 and 32-2 and the person 34 belonging to the boundary pixels 51.

As a result, as illustrated in the right part of FIG. 2, a local map is generated in which bar-like objects with a predetermined height each are assumed to be present at intersection point groups 61-1, 61-2, and 62 including a group of intersection points 61 on the plane S constituting the road surface 31 at the positions where the three-dimensional structures 32-1 and 32-2 and the person 34 are assumed to exist.

It is to be noted that there are no boundary pixels 51 set on the boundary between a zone Z33 belonging to the sky 33 on one hand and the road surface 31 on the other hand in the image P1. The boundary pixels 51 are not set with the sky 33 because the sky 33 does not stand on the road surface 31. In addition, because the zone Z33 of the sky 33 can be estimated from the color of the sky and from its location in the image, the boundary pixels 51 may be arranged to exclude the pixels on the boundary between the zone Z33 of the sky 33 on one hand and the road surface 31 in the vertically downward direction on the other hand.

According to the present disclosure, as depicted in FIGS. 1 and 2, polarized images are acquired by the polarization camera 21. The polarized images thus acquired are used in detecting the normal direction N of the plane constituting the road surface 13. The point X on the plane constituting the road surface 13 is identified using the laser ranging sensor 22. The plane S of the road surface 13 is then identified using the normal direction N and the point X.

Furthermore, an unpolarized image is reconstructed from multiple polarized images. The attributes of the zones in the unpolarized image are identified. A local map is then generated by identifying the positions on the plane S constituting the road surface corresponding to the boundary pixels between the zone constituting the road surface on one hand and the zones of the other constituents in the vertically downward direction in the unpolarized image on the other hand.

<Exemplary Configuration of Mobile Object Control System for Controlling Mobile Object According to Present Disclosure>

Explained below is a mobile object control system that controls the mobile object 11 implementing the above-described functions.

Figure 3:
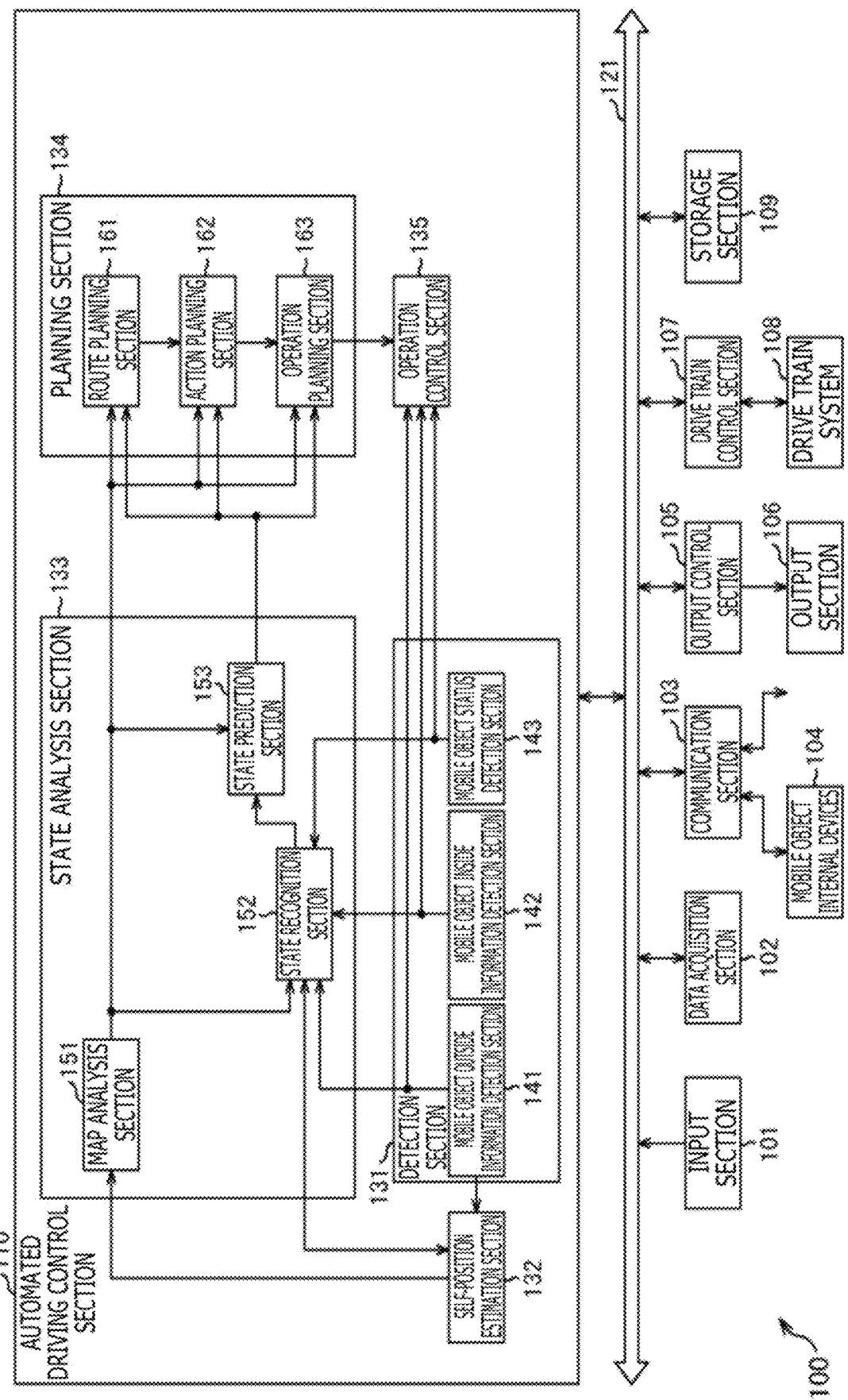
FIG. 3 is a block diagram explaining an exemplary configuration of a mobile object control system for controlling a mobile object according to the present disclosure.

FIG. 3 is a block diagram explaining an exemplary configuration of a schematic function of a mobile object control system 100 that controls the mobile object 11 according to the present disclosure. Incidentally, the mobile object control system 100 in FIG. 3 is an example of the mobile object control system to which the present technology may be applied. This system may, for example, be used to control other mobile objects such as aircrafts, ships, drones, and robots.

The mobile object control system 100 includes an input section 101, a data acquisition section 102, a communication section 103, mobile object internal devices 104, an output control section 105, an output section 106, a drive train control section 107, a drive train system 108, a storage section 109, and an automated driving control section 110. The input section 101, the data acquisition section 102, the communication section 103, the output control section 105, the drive train control section 107, the storage section 109, and the automated driving control section 110 are interconnected via a communication network 121. The communication network 121 may be a communication network, a bus, or the like complying with appropriate protocols such as those of CAN (Controller Area Network), LIN (Local Interconnect Network), LAN (Local Area Network), or FlexRay (registered trademark). The components of the mobile object control system 100 may alternatively be connected directly with each other without the intervention of the communication network 121.

In the description that follows, there will be no reference to the communication network 121 in cases where the components of the mobile object control system 100 communicate with each other by way of the communication network 121. For example, in a case where the input section 101 communicates with the automated driving control section 110 via the communication network 121, it will simply be stated that the input section 101 communicates with the automated driving control section 110.

The input section 101 includes apparatuses used by a passenger for inputting various data, instructions, and the like. For example, the input section 101 includes operating devices for manual input such as a touch panel, buttons, a microphone, switches, and levers, as well as operating devices capable of non-manual input such as by voice, gesture, or the like. As another example, the input section 101 may be a remote control apparatus that uses infrared rays or radio waves, or an externally connected device such as a mobile device or a wearable device supporting the operation of the mobile object control system 100. The input section 101 generates input signals on the basis of the data, instructions or the like input by the passenger and supplies the generated signals to the components of the mobile object control system 100.

The data acquisition section 102 includes various sensors and the like for acquiring data for use in processing by the mobile object control system 100. The data acquisition section 102 supplies the acquired data to the components of the mobile object control system 100.

For example, the data acquisition section 102 includes various sensors for detecting the status of the mobile object and other information. Specifically, the data acquisition section 102 includes, for example, a gyro sensor, an acceleration sensor, an inertial measurement unit (IMU), and sensors for detecting the amount of operation of the accelerator pedal, the operation amount of the brake pedal, the steering angle of the steering wheel, engine speed, motor speed, wheel rotational speed, and the like.

As another example, the data acquisition section 102 includes various sensors for detecting information regarding the outside of the mobile object. Specifically, the data acquisition section 102 includes, for example, an imaging apparatus such as a ToF (Time Of Flight) camera, a stereo camera, a monocular camera, an infrared ray camera, a polarization camera, and other cameras. As a further example, the data acquisition section 102 includes environment sensors for detecting the weather, meteorological conditions or the like, and surrounding information detection sensors for detecting objects surrounding the mobile object. The environment sensors include, for example, a raindrop sensor, a fog sensor, a sunshine sensor, a snow sensor, and the like. The surrounding information detection sensors include, for example, a laser ranging sensor, an ultrasonic sensor, a radar, a LiDAR (Light Detection and Ranging, Laser Imaging Detection and Ranging), a sonar, and the like. It is to be noted that in the mobile object control system 100 of the present disclosure, the data acquisition section 102 has the polarization camera in FIG. 1 as an imaging apparatus and the laser ranging sensor 22 in FIG. 1 as a surrounding information detection sensor.

As another example, the data acquisition section 102 includes various sensors for detecting the current position of the mobile object. Specifically, the data acquisition section 102 includes, for example, a GNSS (Global Navigation Satellite System) receiver for receiving GNSS signals from GNSS satellites, or the like.

As a further example, the data acquisition section 102 includes various sensors for detecting information regarding an inside of the mobile object. Specifically, the data acquisition section 102 includes, for example, an imaging apparatus for imaging the driver, a biosensor for detecting biological information regarding the driver, microphones for collecting sounds from inside the mobile object, and the like. The biosensor is attached to a seat, a steering wheel, or the like, for example, in order to detect biological information regarding the passenger sitting on the seat or the driver holding the steering wheel.

The communication section 103 communicates with the mobile object internal devices 104 and with various devices, servers, and base stations external to the mobile object. In carrying out communications, the communication section 103 transmits to the internal and external devices the data supplied from various components of the mobile object control system 100 and supplies such system components with the data received from these devices. Incidentally, the communication protocol that the communication section 103 supports is not limited to anything specific. Further, the communication section 103 can support multiple types of communication protocols.

For example, the communication section 103 communicates wirelessly with the mobile object internal devices 104 via wireless LAN, Bluetooth (registered trademark), NFC (Near Field Communication), WUSB (Wireless USB), or the like. As another example, the communication section 103 communicates by wire with the mobile object internal devices 104 by means of a connection terminal (and a cable if necessary), not depicted, using USB (Universal Serial Bus), HDMI (registered trademark) (High-Definition Multimedia Interface), MHL (Mobile High-definition Link), or the like.

As a further example, the communication section 103 communicates, via a base station or an access point, with devices (e.g., application servers or control servers) that exist on external networks (e.g., the Internet, cloud networks, or proprietary networks of business operators). As a still further example, the communication section 103 communicates with terminals close to the mobile object (e.g., terminals held by pedestrians or set up by shops or MTC (Machine Type Communication) terminals) using P2P (Peer TO Peer) technology. As a yet further example, in the case where the mobile object 11 is a vehicle, the communication section 103 performs V2X communication such as vehicle to vehicle (Vehicle to Vehicle) communication, vehicle to infrastructure (Vehicle to Infrastructure) communication, mobile object to home (Vehicle to Home) communication, and vehicle to pedestrian (Vehicle to Pedestrian) communication. As another example, the communication section 103 includes a beacon receiver that receives radio waves or electromagnetic waves emitted from wireless stations set up along the road or the like so as to acquire such information as the current position, traffic congestion, traffic controls, and time to reach the destination.

The mobile object internal devices 104 include, for example, a mobile device or a wearable device carried or worn by a passenger, an information device brought on board or attached to the mobile object, and a navigation apparatus that searches for the route to a desired destination.

The output control section 105 controls the output of diverse information regarding the passenger of the mobile object or regarding the outside of the mobile object. For example, the output control section 105 generates an output signal that includes at least either visual information (e.g., image data) or audio information (e.g., voice data) and supplies the generated output signal to the output section 106. The output control section 105 then controls output of the visual information and the audio information by the output section 106. Specifically, the output control section 105 generates a bird's-eye image or a panoramic image by combining image data acquired by a different imaging apparatus in the data acquisition section 102, and supplies an output signal that includes the generated image to the output section 106. As another example, the output control section 105 generates audio data that includes a warning sound, a warning message or the like against dangers such as collision, contact, or entry into a hazardous zone, and supplies an output signal that includes the generated audio data to the output section 106.

The output section 106 includes apparatuses capable of outputting visual information or audio information to the passenger of the mobile object or to the outside of the mobile object. For example, the output section 106 includes a display apparatus, an instrument panel, audio speakers, headphones, a wearable device such as a spectacle type display worn by the passenger, a projector, lamps, and the like. The display apparatus included in the output section 106 may be an apparatus having an ordinary display, or instead a head-up display, a transmissive display, or an apparatus having an AR (Augmented Reality) display function for displaying visual information in the driver's visual field, for example.

The drive train control section 107 generates various control signals and supplies the generated signals to the drive train system 108 to control the drive train system 108. The drive train control section 107 supplies, as needed, control signals to components other than the drive train system 108 so as to notify these components of the control status of the drive train system 108, or the like.

The drive train system 108 includes various apparatuses related to the drive train of the mobile object. For example, the drive train system 108 includes a drive power generation apparatus for causing an internal combustion engine, a drive motor, or the like to generate drive power, a drive power transmission mechanism for transmitting drive power to the wheels, a steering mechanism for adjusting the steering angle, a braking apparatus for generating braking force, ABS (Antilock Brake System), ESC (Electronic Stability Control), an electric power steering apparatus, and the like.

The storage section 109 includes, for example, a magnetic storage device such as a ROM (Read Only Memory), a RAM (Random Access Memory), or an HDD (Hard Disc Drive), a semiconductor device, an optical storage device, a magneto-optical storage device, and the like. The storage section 109 stores various programs, data, and the like for use by the components of the mobile object control system 100. For example, the storage section 109 stores map data constituting three-dimensional high-precision maps such as dynamic maps, global maps having lower precision but covering wider areas than high-precision maps, and local maps including information regarding the surroundings of the mobile object.

The automated driving control section 110 performs control related to automated driving such as autonomous locomotion or drive assistance. Specifically, the automated driving control section 110 performs, for example, collision avoidance or impact mitigation of the mobile object, tracking movement based on the distance between mobile objects, constant speed movement of the mobile object, or coordinated control intended to implement a function of giving a collision warning for the mobile object. As another example, the automated driving control section 110 carries out coordinated control intended to accomplish automated driving for autonomous locomotion without recourse to the driver's operations, or the like. The automated driving control section 110 includes a detection section 131, a self-position estimation section 132, a state analysis section 133, a planning section 134, and an operation control section 135.

The detection section 131 detects diverse information necessary for control of automated driving. The detection section 131 includes a mobile object outside information detection section 141, a mobile object inside information detection section 142, and a mobile object status detection section 143.

The mobile object outside information detection section 141 performs processes of detecting information regarding the outside of the mobile object on the basis of the data or signals from the components of the mobile object control system 100. For example, the mobile object outside information detection section 141 performs processes of detecting, recognizing, and tracking objects surrounding the mobile object, as well as a process of detecting distances to the objects. The objects targeted for detection include, for example, mobile objects, persons, obstacles, structures, roads, traffic lights, traffic signs, road markings, and the like. As another example, the mobile object outside information detection section 141 performs processes of detecting the environment surrounding the mobile object. The surrounding environment targeted for detection include, for example, weather, temperature, humidity, brightness, road surface conditions, and the like. The mobile object outside information detection section 141 supplies data indicative of the result of the detection processes to the self-position estimation section 132, to a map analysis section 151 and a state recognition section 152 in the state analysis section 133, the operation control section 135, and the like.

The mobile object inside information detection section 142 performs processes of detecting information regarding the inside of the mobile object on the basis of the data or signals from the components of the mobile object control system 100. For example, the mobile object inside information detection section 142 performs a process of authenticating and recognizing the driver, a process of detecting the driver's status, a process of detecting a passenger, a process of detecting the internal environment of the mobile object, and the like. The driver's status targeted for detection includes, for example, the physical condition, degree of vigilance, degree of concentration, degree of fatigue, line-of-sight direction, and the like of the driver. The internal environment of the mobile object targeted for detection includes, for example, temperature, humidity, brightness, odor, and the like. The mobile object inside information detection section 142 supplies data indicative of the result of the detection processes to the state recognition section 152 in the state analysis section 133, the operation control section 135, and the like.

The mobile object status detection section 143 performs processes of detecting the status of the mobile object on the basis of the data or signals from the components of the mobile object control system 100. The status of the mobile object targeted for detection includes, for example, speed, acceleration, steering angle, presence or absence of an anomaly with details, driving operation status, position and tilt of the power seat, door lock status, status of other onboard devices of the mobile object, and the like. The mobile object status detection section 143 supplies data indicative of the result of the detection processes to the state recognition section 152 in the state analysis section 133, the operation control section 135, and the like.

The self-position estimation section 132 performs processes of estimating the position, the posture, and the like of the mobile object on the basis of the data or signals from the components of the mobile object control system 100 such as the mobile object outside information detection section 141 and the state recognition section 152 in the state analysis section 133. Further, the self-position estimation section 132 generates, as needed, a local map for use in estimating the self-position (the map is hereinafter referred to as the self-position estimation map). The self-position estimation map may be a high-precision map that uses techniques such as SLAM (Simultaneous Localization and Mapping). The self-position estimation section 132 supplies data indicative of the result of the estimation processes to the map analysis section 151 and state recognition section 152 in the state analysis section 133, and the like. Furthermore, the self-position estimation section 132 causes the storage section 109 to store the self-position estimation map.

The state analysis section 133 performs processes of analyzing the state of the mobile object and the state of its surroundings. The state analysis section 133 includes the map analysis section 151, the state recognition section 152, and a state prediction section 153.

The map analysis section 151 creates a map that includes information required for the processing of automated driving, by performing processes of analyzing various maps stored in the storage section 109 while using, as needed, the data or signals from the components of the mobile object control system 100 such as the self-position estimation section 132 and the mobile object outside information detection section 141. The map analysis section 151 supplies the map thus created to the state recognition section 152 and the state prediction section 153 as well as to a route planning section 161, an action planning section 162, and an operation planning section 163 in the planning section 134.

The state recognition section 152 performs processes of recognizing the state of the mobile object on the basis of the data or signals from the components of the mobile object control system 100 such as the self-position estimation section 132, the mobile object outside information detection section 141, the mobile object inside information detection section 142, the mobile object status detection section 143, and the map analysis section 151. For example, the state recognition section 152 performs processes of recognizing the state of the mobile object, the state of the surroundings of the mobile object, the state of the mobile object driver, and the like. Also, the state recognition section 152 may, as needed, generate a local map for use in recognizing the state of the surroundings of the mobile object (the map is hereinafter referred to as the state recognition map). The state recognition map may be an occupancy grid map (Occupancy Grid Map), for example.

The state of the mobile object targeted for recognition includes, for example, the position, posture, and movement of the mobile object (e.g., speed, acceleration, moving direction, and the like), as well as the presence or absence of an anomaly with details, and the like. The state of the surroundings of the mobile object targeted for recognition includes, for example, the types and positions of motionless objects nearby; the types, positions, and movements of animal bodies nearby (e.g., speed, acceleration, moving direction, and the like); the configuration of the surrounding roads and conditions of the road surface; the ambient weather, temperature, humidity, and brightness; and the like. The state of the driver targeted for recognition includes, for example, the physical condition, degree of vigilance, degree of concentration, degree of fatigue, line-of-sight direction, driving operations, and the like of the driver.

The state recognition section 152 supplies data indicative of the result of the recognition processes (including the state recognition map as needed) to the self-position estimation section 132, the state prediction section 153, and the like. Further, the state recognition section 152 causes the storage section 109 to store the state recognition map.

The state prediction section 153 performs processes of predicting the state related to the mobile object on the basis of the data or signals from the components of the mobile object control system 100 such as the map analysis section 151 and the state recognition section 152. For example, the state prediction section 153 performs processes of predicting the state of the mobile object, the state of the surroundings of the mobile object, the state of the driver, and the like.

The state of the mobile object targeted for prediction includes, for example, the behavior of the mobile object, the occurrence of an anomaly of the mobile object, the movable distance, and the like of the mobile object. The state of the surroundings of the mobile object targeted for prediction includes, for example, the behavior of any animal body near the mobile object, changes of traffic lights, environmental changes such as those of the weather, and the like. The state of the driver targeted for prediction includes, for example, the behavior and physical condition of the driver and the like.

The state prediction section 153 supplies data indicative of the result of the prediction processes, together with data from the state prediction section 152, to the route planning section 161, the action planning section 162, and the operation planning section 163 in the planning section 134 and the like.

The route planning section 161 plans the route to the destination on the basis of the data or signals from the components of the mobile object control system 100 such as the map analysis section 151 and the state prediction section 153. For example, the route planning section 161 sets the route from the current position to the designated destination on the basis of the global map. As another example, the route planning section 161 changes the route as appropriate on the basis of the state of traffic congestion, accidents, traffic controls, road repairing, and the like, as well as on the physical condition and the like of the driver. The route planning section 161 supplies data indicative of the planned route to the action planning section 162 and the like.

The action planning section 162 plans actions of the mobile object for safe movement in a planned period of time along the route planned by the route planning section 161, on the basis of the data or signals from the components of the mobile object control system 100 such as the map analysis section 151 and the state prediction section 153. For example, the action planning section 162 plans start, stop, advancing direction (e.g., forward, backward, left turn, right turn, change of direction, or the like), moving speed, passing, and the like. The action planning section 162 supplies data indicative of the planned actions of the mobile object to the operation planning section 163 and the like.

The operation planning section 163 plans operations of the mobile object for implementing the actions planned by the action planning section 162 on the basis of the data or signals from the components of the mobile object control system 100 such as the map analysis section 151 and the state prediction section 153. For example, the operation planning section 163 plans acceleration, deceleration, course of movement, and the like. The operation planning section 163 supplies data indicative of the planned operations of the mobile object to the operation control section 135 and the like.

The operation control section 135 controls the operations of the mobile object.

More specifically, the operation control section 135 performs processes of detecting an emergency situation such as collision, contact, entry into a hazardous zone, an anomaly of the driver, or an anomaly of the mobile object on the basis of the result of the detection by the mobile object outside information detection section 141, mobile object inside information detection section 142, and mobile object status detection section 143. Upon detecting the occurrence of an emergency situation, the operation control section 135 plans the operation of the mobile object such as a sudden stop or a sharp turn to avert the emergency.

Also, the operation control section 135 controls acceleration and deceleration for implementing the operation of the mobile object planned by the operation planning section 163. For example, the operation control section 135 computes a control target value for the drive power generation apparatus or for the braking apparatus to execute the planned acceleration, deceleration, or sudden stop. The operation control section 135 supplies a control command indicative of the computed control target value to the drive train control section 107.

The operation control section 135 performs directional control for implementing the operation of the mobile object planned by the operation planning section 163. For example, the operation control section 135 computes a control target value for the steering mechanism to implement the course of movement or the sharp turn planned by the operation planning section 163. The operation control section 135 supplies a control command indicative of the computed control target value to the drive train control section 107.

<Exemplary Configuration for Generating Environmental Map>

Figure 4:
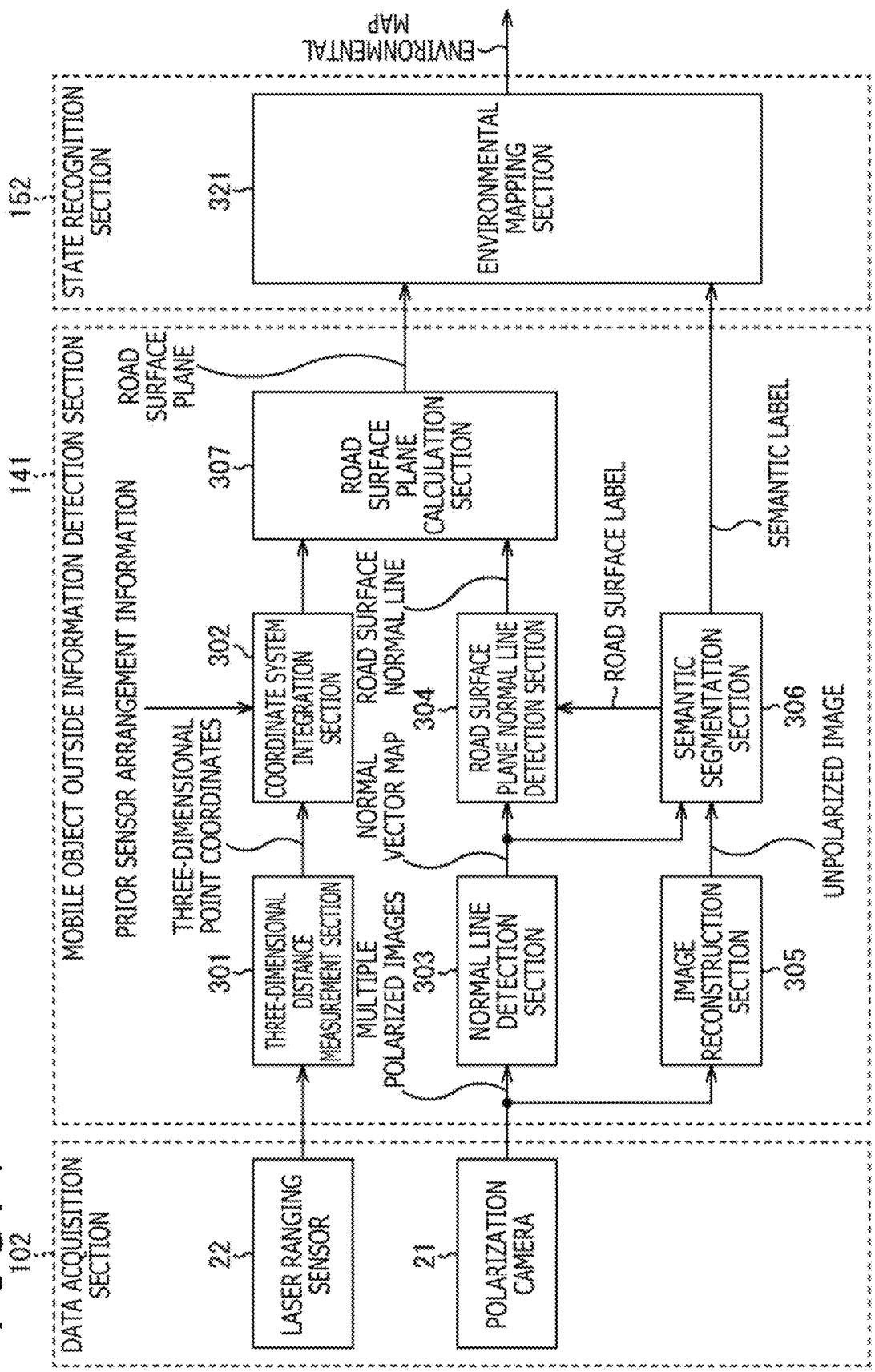
FIG. 4 is a detailed block diagram of an exemplary configuration for generating an environmental map according to the present disclosure.

Explained next with reference to FIG. 4 is a detailed exemplary configuration of the mobile object control system 100 in FIG. 3 for generating an environmental map. The environmental map referenced here is the above-mentioned state recognition map, which is a local map used for recognizing the surrounding state of the mobile object. More specifically, the environmental map includes an occupancy grid map (Occupancy Grid Map).

The detailed exemplary configuration for generating the environmental map is constituted, as depicted in FIG. 4, by the data acquisition section 102, by the mobile object outside information detection section 141 in the detection section 131 of the automated driving control section 110, and by the state recognition section 152 in the state analysis section 133.

The data acquisition section 102 includes the laser ranging sensor 22 and the polarization camera 21.

The mobile object outside information detection section 141 includes a three-dimensional distance measurement section 301, a coordinate system integration section 302, a normal line detection section 303, a road surface plane normal line detection section 304, an image reconstruction section 305, a semantic segmentation section 306, and a road surface plane calculation section 307.

The state recognition section includes an environmental mapping section 321.

The laser ranging sensor 22 projects infrared laser light from the mobile object 11 to a predetermined point on the road surface 13 at a predetermined angle relative to the road surface 13 and, given reflection of the projected infrared laser light from the predetermined point on the road surface 13, measures the distance to that point on the road surface 13 to which infrared laser light is projected from the mobile object 11 at the predetermined angle, on the basis of a round-trip time of the infrared laser light. The laser ranging sensor 22 outputs the result of the measurement to the three-dimensional distance measurement section 301. It is to be noted that the laser ranging sensor 22 will be discussed later in detail with reference to FIG. 5.

The polarization camera 21 acquires polarized images in multiple polarizing directions through filters of multiple polarizing directions. The polarization camera 21 outputs the polarized images thus acquired to the normal line detection section 303 and to the image reconstruction section 305.

The three-dimensional distance measurement section 301 acquires information from the laser ranging sensor 22 regarding the distance from the mobile object 11 to the point on the road surface 13 to which the infrared laser light is projected at the predetermined angle. The three-dimensional distance measurement section 301 then acquires information regarding three-dimensional coordinates of the point on the plane constituting the road surface 13, and outputs the acquired information to the coordinate system integration section 302.

The coordinate system integration section 302 transforms the three-dimensional point coordinates into a coordinate system of the polarization camera 21 for integration with a camera coordinate system of the polarization camera 201, and outputs the transformed coordinates to the road surface plane calculation section 307. The integration of the coordinate system of the laser ranging sensor with that of the polarization camera will be discussed later in detail with reference to FIG. 6.

The normal line detection section 303 generates, on the basis of the polarized images in multiple polarizing directions, a normal vector map constituted by normal directions of the surfaces of the subjects in units of pixels of the polarized images. The normal line detection section 303 outputs the normal vector map thus generated to the road surface plane normal line detection section 304 and to the semantic segmentation section 306. It is to be noted that the detection of normal lines by the normal line detection section 303 will be discussed later in detail with reference to FIG. 7.

The image reconstruction section 305 reconstructs an unpolarized image by obtaining mean values of the pixels of the polarized images in the multiple polarizing directions. The image reconstruction section 305 outputs the reconstructed unpolarized image to the semantic segmentation section 306.

The semantic segmentation section 306 estimates the type of the subject to which each pixel belongs using machine learning such as deep learning, on the basis of the normal vector map and the unpolarized image, sets the result of the estimation as a semantic label, and outputs the semantic label to the environmental mapping section 328. Further, the semantic segmentation section 306 outputs to the road surface plane normal line detection section 304 information regarding the pixels labeled to the road surface 13 out of the information regarding the pixels categorized by semantic label. It is to be noted that semantic segmentation will be discussed later in detail with reference to FIG. 9.

The road surface plane normal line detection section 304 obtains the normal direction of the plane constituting the road surface 13 (normal vector of the road surface) using the normal vector map from the normal line detection section 303 and the information regarding the pixels labeled to the road surface 13. The normal line detection section 303 outputs the obtained normal direction as the information regarding the road surface normal line to the road surface plane calculation section 307. It is to be noted that detection of the normal line of the road surface plane will be discussed later in detail with reference to FIG. 8.

The road surface plane calculation section 307 calculates the plane constituting the road surface on the basis of the information regarding the normal vector of the plane constituting the road surface plane as the information regarding the road surface normal line and of the information regarding the three-dimensional coordinates of the point on the plane. The road surface plane calculation section 307 outputs the plane thus calculated to the environmental mapping section 308.

The environmental mapping section 321 generates an environmental map through an environmental mapping process on the basis of the information regarding the plane constituting the road surface 13 and the semantic labeling information. It is to be noted that environmental mapping will be discussed later in detail with reference to FIG. 10.

<Laser Ranging Sensor>

Figure 5:
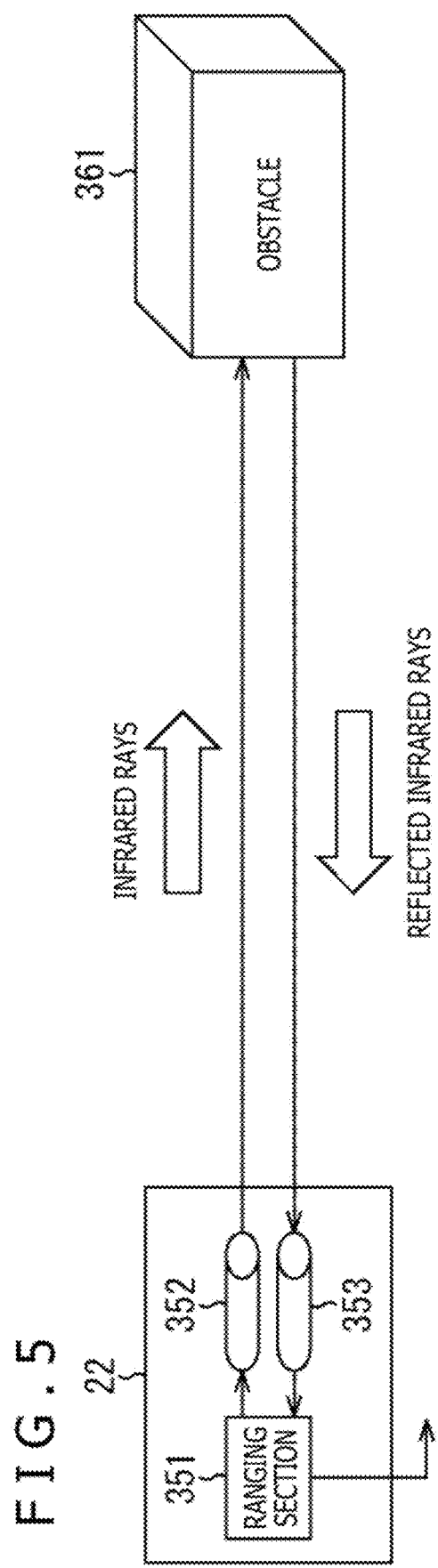
FIG. 5 is a view explaining a laser ranging sensor.

The laser ranging sensor 22 is explained next in detail with reference to FIG. 5. The laser ranging sensor 22 includes, as depicted in FIG. 5, a ranging section 351, a light projection section 352, and a light reception section 353.

The ranging section 351 controls the light projection section 352 to project infrared laser light in the direction of the road surface 13 at a predetermined angle relative to the road surface 13. At this time, the ranging section 351 stores the time at which the light projection section 352 was caused to project the infrared laser light.

The ranging section 351 further controls the light reception section 353 to receive reflection of the projected infrared laser light from an obstacle 361 (corresponding to the road surface 13). At the same time, the ranging section 351 stores the time at which the reflected infrared laser light was received.

The ranging section 351 then obtains the round-trip time to the obstacle 361 from the difference between the time at which infrared laser light was projected by the light projection section 352 and the time at which the reflected light from the obstacle 361 was received by the light reception section 353. From the round-trip time thus obtained, the ranging section 351 measures the distance to the obstacle 361.

It is to be noted that the illustration in FIG. 5 is merely intended to explain the principle of ranging used by the laser ranging sensor 22. In practice, the laser ranging sensor 22 measures the distance from the mobile object 11 to a predetermined point on the road surface 13 at a predetermined angle relative to the road surface 13.

<Integration of Coordinate System of Laser Ranging Sensor with that of Polarization Camera>

Figure 6:
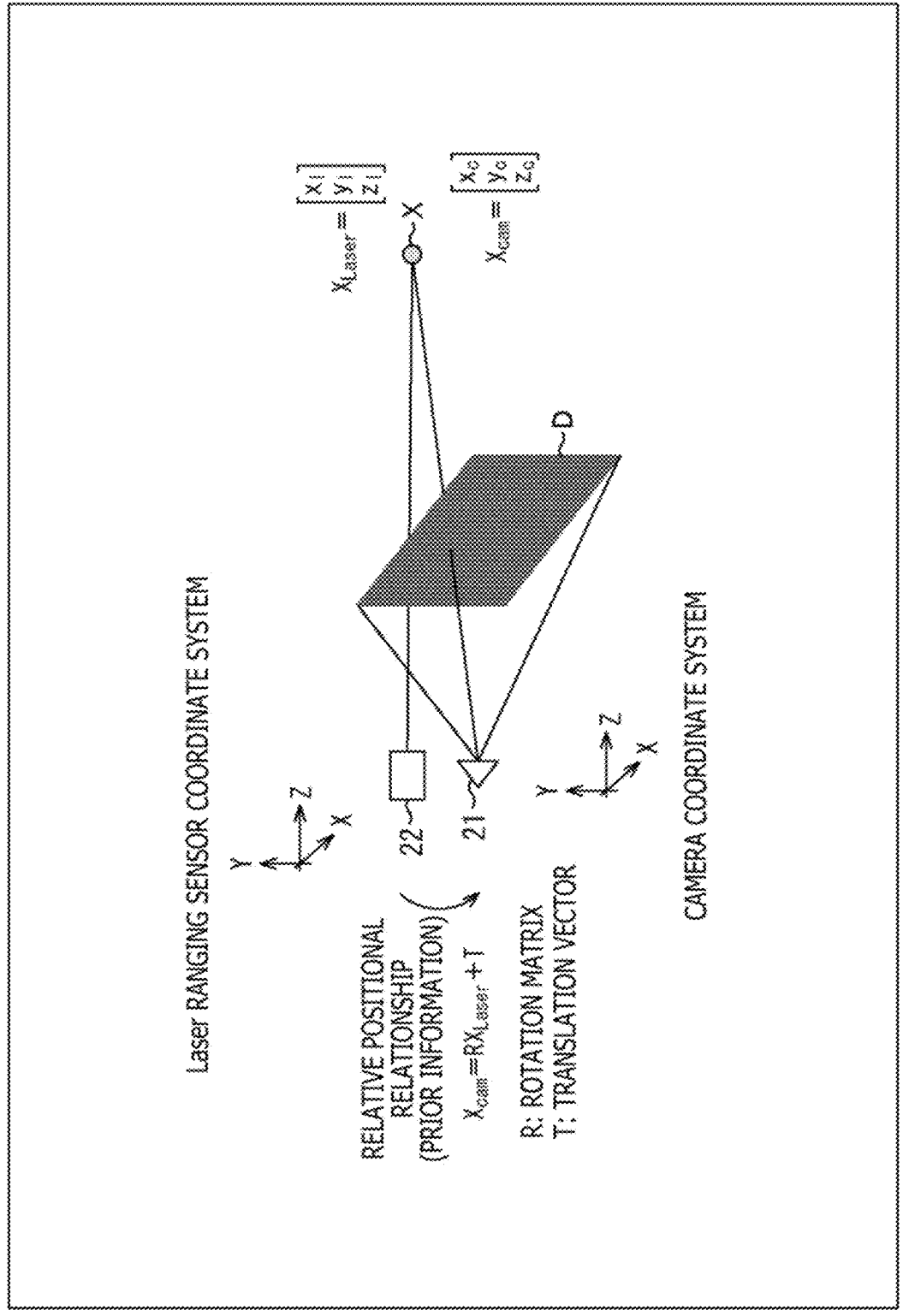
FIG. 6 is a view explaining the transformation between the coordinate system of a laser ranging sensor and the coordinate system of a polarization camera.

Explained next with reference to FIG. 6 is the integration of the coordinate system of the laser ranging sensor 22 with that of the polarization camera 21.

As depicted in FIG. 6, the relationship between coordinates $X_{Laser}$ (=transposition of [xL, yL, zL]) of the point X on the road surface 13 in the coordinate system of the laser ranging sensor 22 on one hand, the distance to the point X being measured by the laser ranging sensor 22, and coordinates $X_{cam}$ (=transposition of [xc, yc, zc]) in the coordinate system of the polarization camera 21 on the other hand, is known by calibration as prior sensor arrangement information. For example, the relationship is obtained as the following expression (2):

$$X_{cam} = RX_{Laser} + T \tag{2}$$

In the above expression, R stands for the rotation matrix indicative of the angle between the laser ranging sensor 22 and the polarization camera 21, and T for a translation vector obtained from the positional relationship between the laser ranging sensor 22 and the polarization camera 21.

By performing an operation using the above expression (2), the coordinate system integration section 302 transforms the coordinates of the point X on the plane constituting the road surface 13, the coordinates being measured as information regarding the coordinate system of the laser ranging sensor 22, into the camera coordinate system for integration of the two coordinate systems.

<Detection of Normal Lines from Polarized Images>

The detection of normal lines from the polarized images is next explained with reference to FIG. 7.

On the basis of multiple polarized images, the normal line detection section 303 obtains the normal direction of the surface of the subject to which each pixel in the images belongs, as polar coordinates with a zenith angle $\theta$ and an azimuth angle $\varphi$, to thereby generate a normal vector map.

Figure 7:
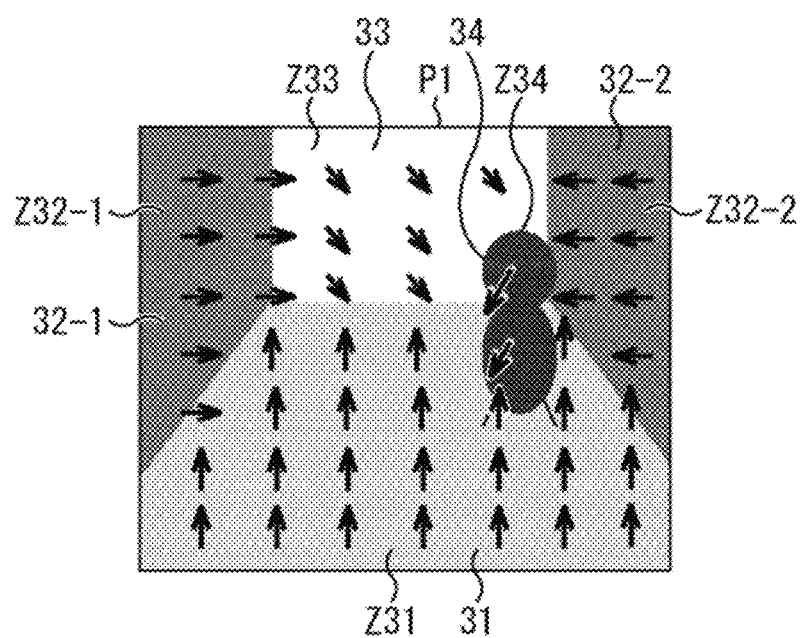
FIG. 7 is a view explaining an example of detecting normal directions of a surface of a subject in images.
Figure 8:
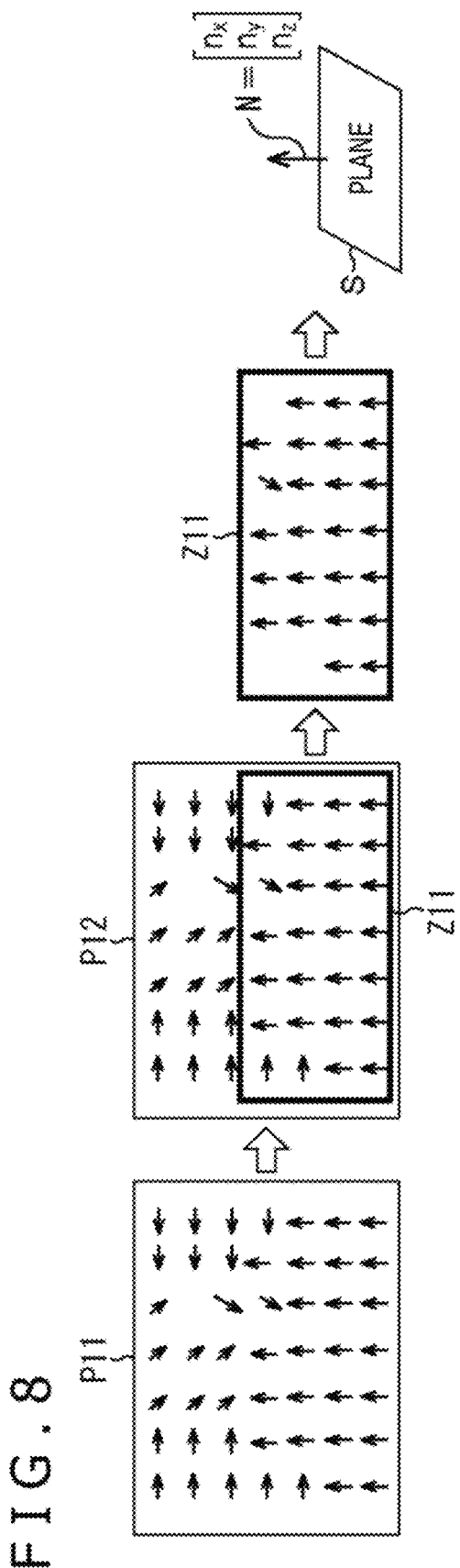
FIG. 8 is a view explaining a method of obtaining the plane constituting the road surface.

For example, in the case of an image P1 in FIG. 7, the distribution of arrows indicative of normal directions is regarded as the normal vector map (the leftmost part in FIG. 8).

In other words, in FIG. 7, a region below an approximate center of the image P1 is regarded as the zone Z31 of the road surface 31; left and right regions in the image P1 are regarded as the zones Z32-1 and Z32-2 (of the walls) of the three-dimensional structures 32-1 and 32-2; a region in a top center is regarded as the zone Z33 of the sky 33; and a region of the person 34 on the left of the zone Z32-2 of the right-side three-dimensional structure 32-2 and above the zone Z31 of the road surface 31 is regarded as the zone Z34.

In the zone Z31 of the road surface 31, arrows indicative of the normal direction perpendicular to the road surface 31 are distributed. In the zone Z32-1 (of the wall) of the three-dimensional structure 32-1 on the left in the image P1, arrows indicative of the rightward direction perpendicular to the wall in FIG. 7 are distributed. Further, in the zone Z32-1 (of the wall) of the three-dimensional structure 32-1 on the right in the image P1, arrows indicative of the leftward direction perpendicular to the wall in FIG. 7 are distributed.

<Detection of Normal Line of Road Surface Plane>

The detection of the normal line of the road surface plane is next explained with reference to FIG. 8.

The normal line of the road surface plane, which is a normal line of the plane constituting the road surface, is detected as the dominant normal direction of the pixels in the region labeled by semantic segmentation to the road surface in the normal vector map.

In other words, consider, for example, the case of a normal vector map P11 depicted in the leftmost part of FIG. 8. In this case, if the region of the pixels labeled to the road surface 13 in the normal vector map P11 is a zone Z11 as depicted second from left in FIG. 8, the zone Z11 of the normal vector map is extracted as an ROI (Region of Interest) zone (zone of interest).

Next, as depicted third from left in FIG. 8, for example, those normal lines in the extracted zone Z11 that are obviously not in the normal direction of the road surface, such as normal lines facing straight at the polarization camera 21, for example, are excluded.

A histogram of the remaining normal lines is then generated, and the dominant normal line is extracted. Information regarding the normal line is constituted by polar coordinates with the zenith angle $\theta$ and the azimuth angle $\varphi$. Thus, the normal line information constituted by the polar coordinates is transformed into an orthogonal coordinate system and, as depicted in the rightmost part of FIG. 8, is output as a normal vector N [nx, ny, nz] of the plane S constituting the road surface.

<Semantic Segmentation>

Semantic segmentation is next explained with reference to FIG. 9.

Figure 9:
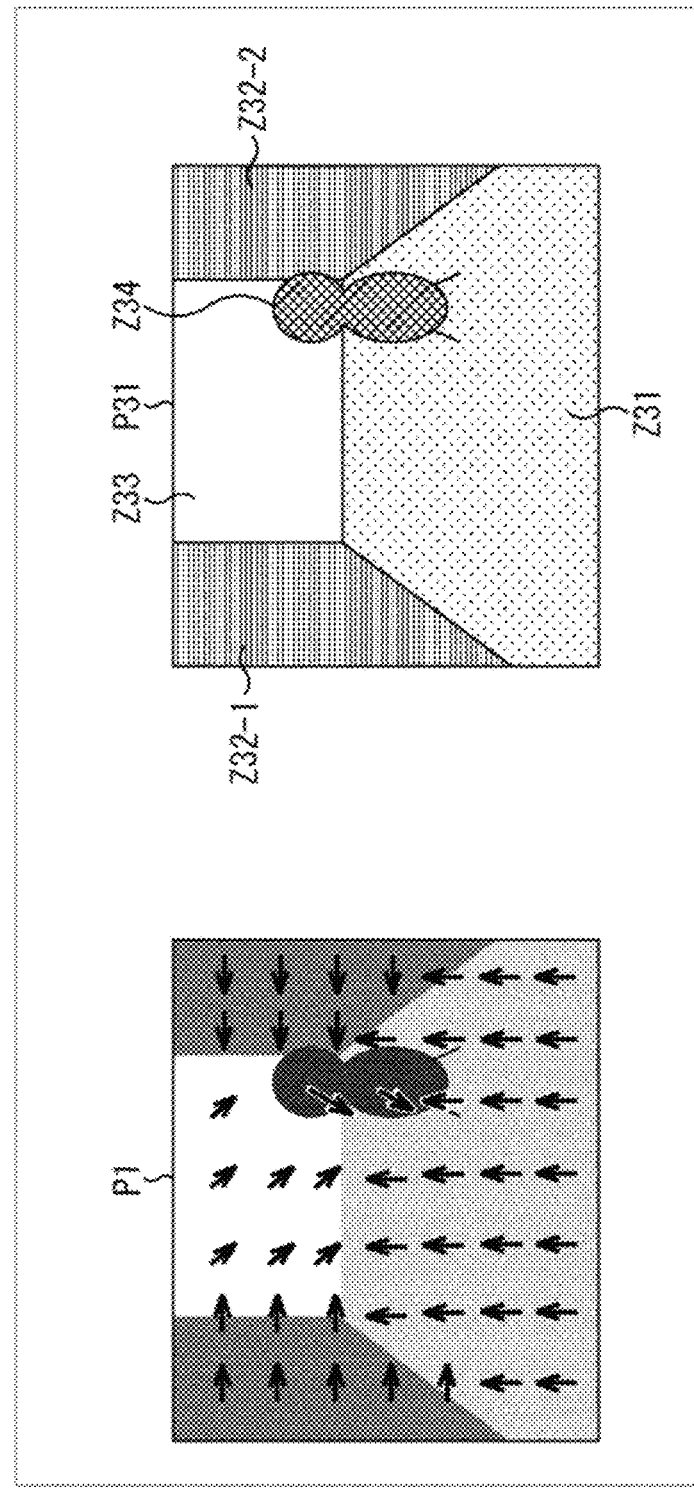
FIG. 9 is a view explaining semantic segmentation.

For example, from the normal vector map P1 on the left and an unpolarized image P31 in FIG. 9, the subject to which each pixel in the image belongs is estimated through machine learning such as deep learning. The result of the estimation is provided as semantic labels. In the present case, however, it is sufficient to categorize as semantic labels at least three types of subjects, i.e., the road surface, obstacles, and the sky.

For example, in the left-side image P1 in FIG. 9, the zone Z31 in which an absolute value of an inner product between the vertical direction and the detected normal vector is larger than a predetermined value may be semantically labeled as the road surface 31. With regard to the remaining zones Z32-1, Z32-2, and Z34, the three-dimensional structures 32-1 and 32-2 as well as the person 34 may be semantically labeled collectively as obstacles.

Further, the zone Z33 in the upper part of the image where the luminance level is high may be semantically labeled as the sky 33.

<Environmental Mapping>

Environmental mapping is next explained with reference to FIG. 10.

Figure 10:
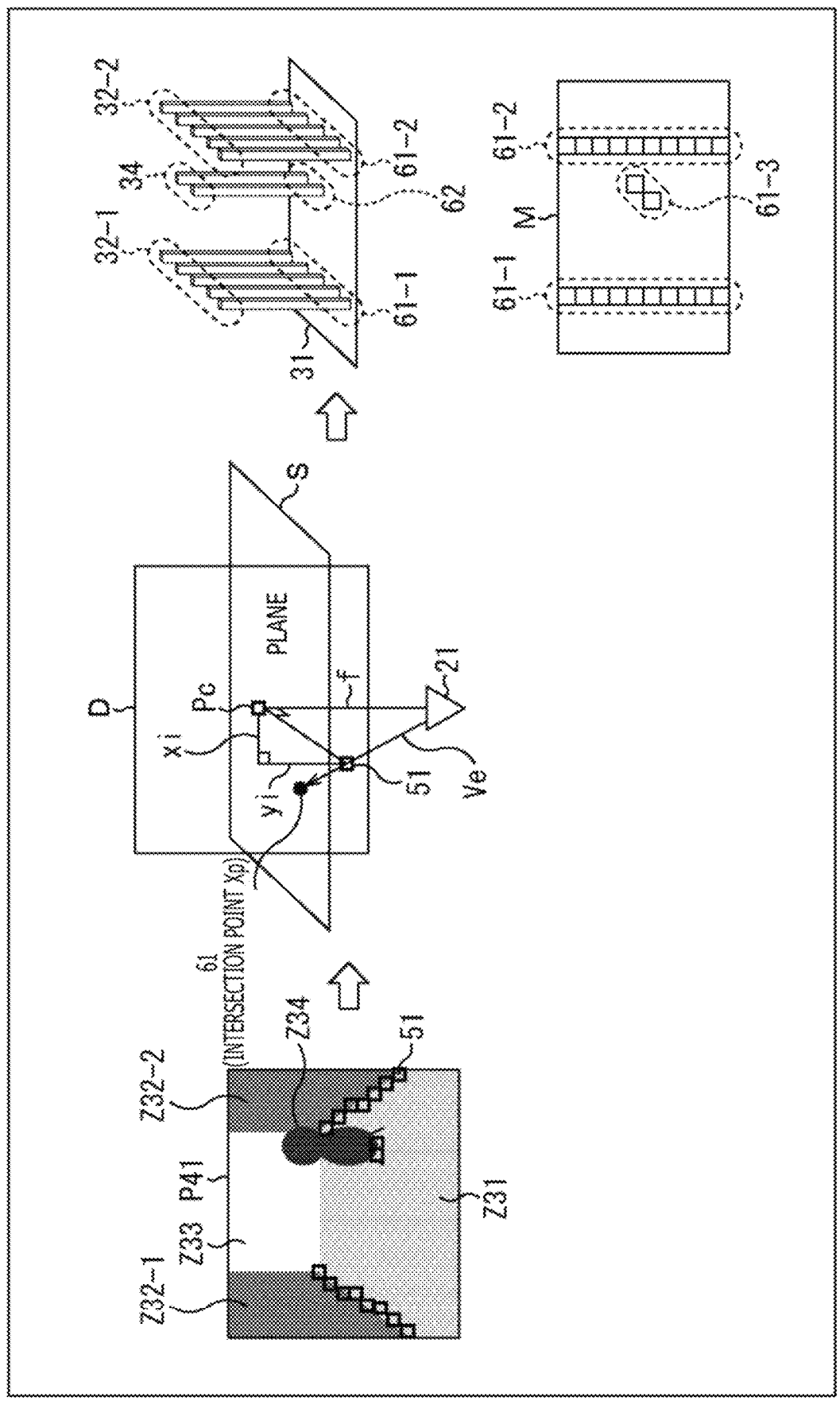
FIG. 10 is a view explaining a method of generating an environmental map.

With regard to the unpolarized image P1 depicted on the left in FIG. 10, it is assumed that the zone Z31 of the road surface 31, the zones Z32-1 and Z32-2 of the three-dimensional structure 32-1 and 32-2, the zone Z33 of the sky 33, and the zone Z34 of the person 34 are each semantically labeled by semantic segmentation. It is assumed here that the zones Z32-1, Z32-2, and Z34, regarded as obstacles apart from the zone Z31 of the road surface 31 and the zone Z33 of the sky 33, constitute obstacle zones.

In this case, the pixels (pixels indicated as square cells) of the boundary between the zone Z31 of the road surface 31 on one hand and the obstacle zones Z32-1, Z32-2, and Z34 on the other hand in the vertically downward direction are extracted as boundary pixels 51.

Then the coordinates of each boundary pixel 51 in the camera coordinate system of the polarization camera 21 are transformed into coordinates on the plane S constituting the road surface 31.

In other words, as depicted in the center part of FIG. 10, when the polarization camera 21 acquires the unpolarized image P1 for example, it is assumed that the focal position is at an image center (center pixel) Pc and that, with the imaging position of the polarization camera 21 taken as the start point, a line-of-sight vector to the boundary pixel 51 is defined as (xi, yi, f). Here, xi and yi represent the pixel position in an image D acquired by the polarization camera 21 with the center pixel Pc taken as the origin, and f denotes the focal point distance from the polarization camera 21 with its focal position at the image center (center pixel) Pc.

At this time, an intersection point Xp corresponding to the boundary pixel 51 between the line of sight from the polarization camera 21 and the plane S constituting the road surface 31 is defined by the following expression (3):

[Math. 2]

$$\text{Point of intersection with the plane: } x_P = s \begin{bmatrix} x_i \\ y_i \\ z_i \end{bmatrix} \quad (3)$$

In the above expression, s stands for a coefficient, which is a scalar quantity. In other words, the vector starting from the polarization camera 21 up to the intersection point Xp is a line-of-sight vector Ve multiplied by the coefficient s. Thus, the constant s is obtained by assigning the mathematical expression (3) to the equation of the plane S constituting the road surface, the equation being defined by the above expression (1). With the constant s obtained, the coordinates of the intersection point 61 on the plane S are acquired accordingly.

Thereafter it is assumed that there exist obstacles of a predetermined height at the boundary pixels 51 on the boundary therewith on the plane S constituting the obtained road surface 31, as depicted in the top right of FIG. 10, for example. This provides a three-dimensional distribution of the road surface 31 and the obstacles 32-1, 32-2, and 34 corresponding to the unpolarized image P1.

On the basis of information regarding the three-dimensional distribution of the road surface 31 and the obstacles 32-1, 32-2, and 34 corresponding to the unpolarized image P1, a distribution of intersection point groups 61-1, 61-2, and 62 corresponding to the obstacle zones Z32-1, Z32-2, and Z34 as viewed from above the plane S is generated as an environmental map M.

<Environmental Map Generating Process>

Figure 11:
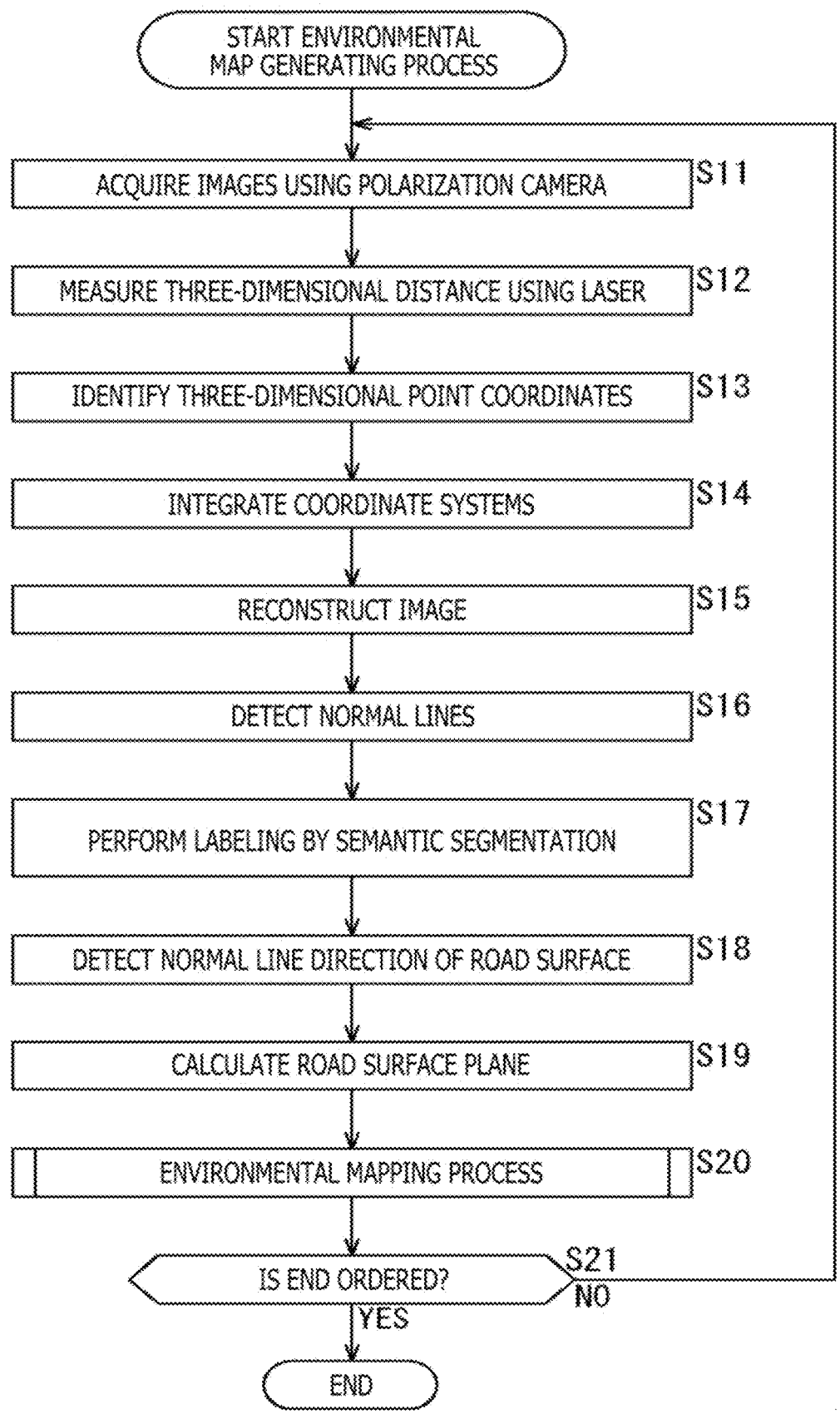
FIG. 11 is a flowchart explaining an environmental map generating process.

An environmental map generating process is next explained with reference to the flowchart of FIG. 11.

In step S11, the polarization camera 21 acquires polarized images in multiple polarizing directions of the front of the mobile object at a predetermined field angle relative thereto through filters of the multiple polarizing directions, for example. The polarization camera 21 outputs the acquired polarized images to the normal line detection section 303 and to the image reconstruction section 305.

In step S12, the laser ranging sensor 22 projects laser light to the road surface and receives reflected light from the road surface as explained above with reference to FIG. 5. The laser ranging sensor 22 measures the distance to the road surface 13 by what is generally called the ToF method based on the difference between the time at which light is projected and the time at which reflected light is received. The laser ranging sensor 22 outputs the result of the measurement to the three-dimensional distance measurement section 301.

In step S13, on the basis of the result of ranging by the laser ranging sensor 22, the three-dimensional distance measurement section 301 identifies the three-dimensional coordinates of the point from which the laser light was reflected and which is on the plane S constituting the road surface 13, in terms of coordinates in the coordinate system of the laser ranging sensor 22. The three-dimensional distance measurement section 301 outputs the coordinates thus identified to the coordinate system integration section 302.

In step S14, the coordinate system integration section 302 transforms the three-dimensional coordinates of the point on the plane S constituting the road surface 13 in the coordinate system of the laser ranging sensor 22 into coordinates of the camera system coordinates of the polarization camera 21, as explained above with reference to FIG. 6. The coordinate system integration section 302 outputs the transformed coordinates to the road surface plane calculation section 307.

In step S15, the image reconstruction section 305 reconstructs an unpolarized image by obtaining mean values of the pixels of the images in the multiple polarizing directions. The image reconstruction section 305 outputs the reconstructed unpolarized image to the semantic segmentation section 306.

In step S16, on the basis of the polarized images, the normal line detection section 303 detects the normal direction of each pixel on the surface of the subject in the polarized images as explained above with reference to FIG. 7. The normal line detection section 303 outputs the detected normal direction as a normal vector map to the road surface plane normal line detection section 304 and to the semantic segmentation section 306.

In step S17, on the basis of the unpolarized image and the normal vector map, the semantic segmentation section 306 labels through semantic segmentation each pixel in the unpolarized image as to which subject in the image the pixel belongs, as explained above with reference to FIG. 9. The semantic segmentation section 306 attaches the semantic label to each pixel before outputting the label to the environmental mapping section 321 in units of pixels. At this time, the semantic segmentation section 306 outputs information regarding the pixels labeled to the road surface to the road surface plane normal line detection section 304.

In step S18, the road surface plane normal line detection section 304 detects the normal direction of the road surface from the normal vector map and from the information regarding the pixels labeled to the road surface, as explained above with reference to FIG. 8. The road surface plane normal line detection section 304 outputs the detected normal direction to the road surface plane calculation section 307.

In step S19, the road surface plane calculation section 307 calculates the equation of the plane S constituting the road surface 13 on the basis of the information regarding the normal direction of the road surface and the information regarding the three-dimensional coordinates of the point on the plane constituting the road surface, as explained above with reference to FIG. 1. The road surface plane calculation section 307 outputs the calculated equation as information regarding the road surface plane to the environmental mapping section 321.

In step S20, the environmental mapping section 321 generates and outputs an environmental map by performing an environmental mapping process on the basis of the information regarding the road surface plane and on the semantic labels. It is to be noted that the environmental mapping process will be discussed later in detail with reference to the flowchart of FIG. 12.

In step S21, it is determined whether an end of the process is ordered. If an end is not ordered, control is returned to step S11 and the subsequent steps are repeated. If it is determined in step S21 that an end of the process is ordered, the process is terminated.

In other words, the above process provides the three-dimensional coordinates of the point on the plane constituting the road surface, the distance to the point being measured by the laser ranging sensor 22, and the normal direction of the plane constituting the road surface obtained from the polarized images in multiple polarizing directions acquired by the polarization camera 21. The plane S constituting the road surface is then identified from the information regarding the three-dimensional coordinates of the point on the plane constituting the road surface and the normal direction of the plane constituting the road surface.

As a result, the environmental map is generated by the environmental mapping process using the information regarding the plane S constituting the identified road surface.

<Environmental Mapping Process>

Figure 12:
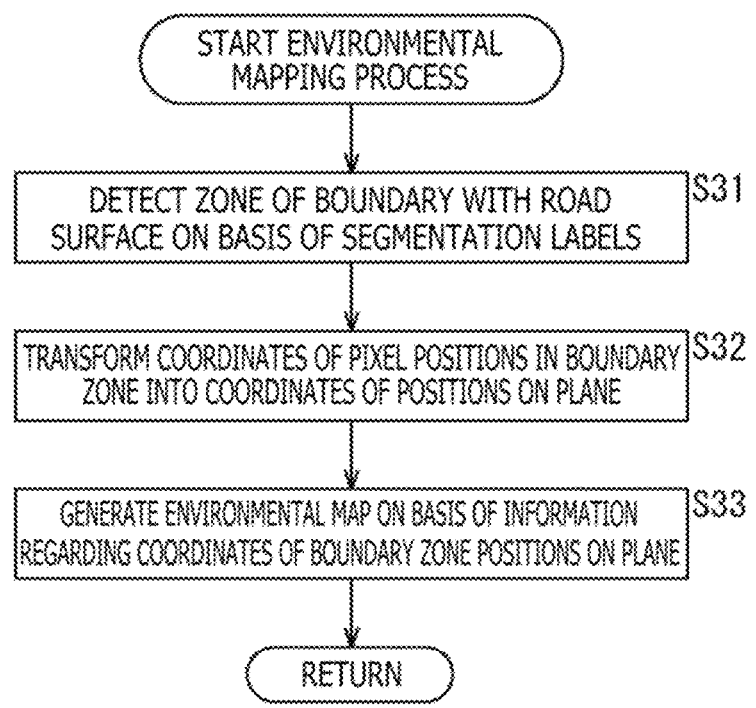
FIG. 12 is a flowchart explaining an environmental mapping process.

The environmental mapping process performed by the environmental mapping section 321 is next explained with reference to the flowchart of FIG. 12.

In step S31, the environmental mapping section 321 detects, on the basis of the segmentation labels, the boundary pixel 51 on the boundary between the zone Z31 of the road surface 31 on one hand and the zones Z32-1, Z32-2, and Z34 of the obstacles 32-1, 32-2, and 34 on the other hand in the unpolarized image, as explained above with reference to the left part of FIG. 10.

In step S32, the environmental mapping section 321 transforms the coordinates of the boundary pixel 51 in the unpolarized image to the coordinates of the corresponding intersection point 61 on the plane constituting the road surface 31, as explained above with reference to the center part of FIG. 10.

In step S33, the environmental mapping section 321 generates and outputs the environmental map indicative of the positions where there exist the obstacles on the plane constituting the road surface 31, on the basis of the information regarding the coordinates of the intersection point 61 with the boundary pixel 51 on the plane, as explained above with reference to the right part of FIG. 10.

The above process makes it possible to generate the environmental map on the basis of the information regarding the road surface and the obstacles included in the unpolarized image.

Explained above was an example in which the laser ranging sensor 22 measures the distance to a single point on the road surface so that a single intersection point constitutes the road surface. Alternatively, the distances to multiple points on the road surface may be measured, and multiple intersection points on the road surface may be used to identify the plane constituting the road surface.

In measuring the distance to a predetermined point on the road surface from the mobile object 11, not only the laser ranging sensor 32 but also a stereo camera or a millimeter-wave radar may be used to detect the point.

It is further assumed in the above description that the road surface is a plane with no irregularities. However, even with the road surface having irregularities, the dominant normal direction from among the normal direction of each of the pixels labeled to the road surface is utilized. That means an average normal direction covering the irregularities on the road surface may be used as the dominant normal direction. As another alternative, multiple intersection points on the road surface may be obtained and averaged so as to acquire an average plane constituting the road surface.

Also described above is the plane constituting the road surface relative to the moving direction of the mobile object 11. However, it is sufficient that the plane be such as to constitute a movement-enabling region into which the mobile object is about to move.

Also explained above is an example in which the dominant normal direction is obtained from among the normal direction of each of the pixels to which the attribute of the road surface is set through the use of the normal vector map acquired from polarized images in multiple polarizing directions. However, any other suitable method may be used to obtain the normal direction. For example, existing map information may be used to obtain the normal direction. Alternatively, a stereo camera may be employed to acquire the normal direction.

2. Examples of Process Execution by Software

The series of processes described above may be executed either by hardware or by software. Where the series of processes is to be carried out by software, the programs constituting the software are installed into a suitable computer from recording media. Variations of the computer include one with the software installed beforehand in its dedicated hardware and a general-purpose personal computer or like equipment capable of executing diverse functions on the basis of the programs installed therein.

FIG. 13 is a view depicting an exemplary configuration of a general-purpose computer. This computer incorporates a CPU (Central Processing Unit) 1001. The CPU 1001 is connected with an input/output interface 1005 via a bus 1004. The bus 1004 is connected with a ROM (Read Only Memory) 1002 and a RAM (Random Access Memory) 1003.

The input/output interface 1005 is connected with an input section 1006, an output section 1007, a storage section 1008, and a communication section 1009. The input section 1006 includes input devices such as a keyboard and a mouse with which a user inputs operation commands. The output section 1007 outputs process operation screens and images of the results of processing to a display device. The storage section 1008 includes a hard disk drive for storing programs and diverse data. The communication section 1009 includes a LAN (Local Area Network) adapter and the like and executes communication processes via networks typified by the Internet. The input/output interface 1005 is further connected with a drive 1010 that writes and reads data to and from removable media 1011 such as magnetic discs (including flexible discs), optical discs (including CD-ROM (Compact Disc-Read Only Memory) and DVD (Digital Versatile Disc)), magneto-optical discs (including MD (Mini Disc)), or a semiconductor memory.

The CPU 1001 carries out diverse processes in accordance with programs stored in the ROM 1002 or with programs loaded into the RAM 1003 from the storage section 1008 in which these programs were installed after being read out from the removable media 1011 such as magnetic discs, optical discs, magneto-optical discs, or a semiconductor memory. As appropriate, the RAM 1003 also stores the data required by the CPU 1001 in executing the diverse processes.

In the computer configured as described above, the CPU 1001 performs the above-mentioned series of processing by loading appropriate programs, for example, from the storage section 1008 into the RAM 1003 via the input/output interface 1005 and the bus 1004 and by executing the loaded programs.

The programs to be executed by the computer (CPU 1001) may be recorded, for example, on the removable media 1011 as packaged media, when offered. The programs may alternatively be offered via wired or wireless transmission media such as local area networks, the Internet, and digital satellite broadcasting.

In the computer, the programs may be installed in the storage section 1008 from the removable media 1011 attached to the drive 1010, via the input/output interface 1005. The programs may also be installed in the storage section 1008 after being received by the communication section 1009 via wired or wireless transmission media. The programs may alternatively be preinstalled in the ROM 1002 or in the storage section 1008.

Incidentally, the programs to be executed by the computer may each be processed chronologically, i.e., in the sequence depicted in this description, in parallel with other programs, or in otherwise appropriately timed fashion such as when the program is invoked as needed.

It is to be noted that the CPU 1001 in FIG. 13 implements the function of the automated driving control section 110 in FIG. 3. In addition, the storage section 1008 in FIG. 13 implements the function of the storage section 109 in FIG. 3.

In this description, the term "system" refers to an aggregate of multiple components (e.g., apparatuses, modules (parts) or the like). It does not matter whether all components are housed in the same enclosure. Thus, a system may be configured with multiple apparatuses housed in separate enclosures and interconnected via a network, or with a single apparatus in a single enclosure that houses multiple modules.

The present disclosure is not limited to the embodiments discussed above and may be implemented in diverse variations so far as they are within the scope of the appended claims or the equivalents thereof.

For example, the present disclosure may be implemented as a cloud computing setup in which a single function is processed cooperatively by multiple networked apparatuses on a shared basis.

Also, each of the steps discussed in reference to the above-described flowcharts may be executed either by a single apparatus or by multiple apparatuses on a shared basis.

Furthermore, if a single step includes multiple processes, these processes may be executed either by a single apparatus or by multiple apparatuses on a shared basis.

The present disclosure may also be implemented in the following configurations:

(1) An information processing apparatus including:
a movement-enabling region normal line detection section configured to detect a normal direction of a plane constituting a movement-enabling region for a mobile object;
a position identification section configured to identify a position of a point on the plane constituting the movement-enabling region; and
a plane identification section configured to identify the plane constituting the movement-enabling region on the basis of the normal direction of the movement-enabling region and the position of the point in the movement-enabling region.

(2) The information processing apparatus as stated in paragraph (1) above, further including:
a polarization camera configured to acquire polarized images in multiple polarizing directions, in which
the movement-enabling region normal line detection section detects, on the basis of the polarized images, the normal direction of the plane constituting the movement-enabling region for the mobile object.

(3) The information processing apparatus as stated in paragraph (2) above, further including:
a normal direction detection section configured to detect, in units of pixels, a normal direction of a surface of a subject in the polarized images before outputting the detected normal direction as a normal vector map;
a reconstruction section configured to reconstruct an unpolarized image from the multiple polarized images; and
an attribute setting section configured to set an attribute of the subject to each of the pixels in the unpolarized image, in which
the movement-enabling region normal line detection section detects a dominant normal direction on the normal vector map corresponding to a region having those pixels in the unpolarized image of which the attribute is set to the movement-enabling region by the attribute setting section, the dominant normal direction being the normal direction of the plane constituting the movement-enabling region.

(4) The information processing apparatus as stated in paragraph (3) above, in which
the attribute setting section sets, through semantic segmentation, the attribute of the subject to each of the pixels in the unpolarized image.

(5) The information processing apparatus as stated in paragraph (3) above, further including:
an environmental mapping section configured to generate an environmental map on the basis of information regarding the attribute of the subject set to each of the pixels in the unpolarized image and information regarding the plane identified by the plane identification section.

(6) The information processing apparatus as stated in paragraph (5) above in which,
given the information regarding the attribute of the subject set to each of the pixels in the unpolarized image, the environmental mapping section generates the environmental map on the basis of information regarding the pixels of which the attribute is set to the movement-enabling region and information regarding the pixels of which the attribute is set to an obstacle, the environmental map being indicative of a position of the obstacle on the plane constituting the movement-enabling region.

(7) The information processing apparatus as stated in paragraph (6) above in which,
given the information regarding the attribute of the subject set to each of the pixels in the unpolarized image, the environmental mapping section generates the environmental map by taking the position on the plane constituting the movement-enabling region and corresponding to a boundary pixel in a vertically downward direction between the region of the pixels of which the attribute is set to the movement-enabling region on one hand and the region of the pixels of which the attribute is set to the obstacle on the other hand, as the position of the obstacle on the plane constituting the movement-enabling region.

(8) The information processing apparatus as stated in paragraph (5) above, in which
the environmental map is an occupancy grid map (Occupancy Grid Map).

(9) The information processing apparatus as stated in paragraph (2) above, further including:
a coordinate system integration section configured to integrate a coordinate system indicative of the position of the point identified by the position identification section in the movement-enabling region with a coordinate system of the polarized images acquired by the polarization camera.

(10) The information processing apparatus as stated in paragraph (2) above, further including:
a ranging section configured to measure a distance to a point in the movement-enabling region, in which
the position identification section identifies the position of the point in the movement-enabling region on the basis of the distance, measured by the ranging section, to the point in the movement-enabling region.

(11) The information processing apparatus as stated in paragraph (10) above, in which
the ranging section includes a laser ranging sensor, a stereo camera, or a millimeter-wave radar.

(12) The information processing apparatus as stated in paragraph (1) above, in which
the movement-enabling region includes a road surface.

(13) An information processing method including the steps of:
detecting, on the basis of a polarized image, a normal direction of a plane constituting a movement-enabling region for a mobile object;
identifying a position of a point in the movement-enabling region; and
identifying the plane constituting the movement-enabling region on the basis of the normal direction of the movement-enabling region and the position of the point in the movement-enabling region.

(14) A program for causing a computer to execute a process including:
a movement-enabling region normal line detection section configured to detect, on the basis of a polarized image, a normal direction of a plane constituting a movement-enabling region for a mobile object;
a position identification section configured to identify a position of a point on the plane constituting the movement-enabling region; and
a plane identification section configured to identify the plane constituting the movement-enabling region on the basis of the normal direction of the movement-enabling region and the position of the point in the movement-enabling region.

(15) A mobile object including:
a movement-enabling region normal line detection section configured to detect, on the basis of a polarized image, a normal direction of a plane constituting a movement-enabling region for the mobile object;
a position identification section configured to identify a position of a point on the plane constituting the movement-enabling region;
a plane identification section configured to identify the plane constituting the movement-enabling region on the basis of the normal direction of the movement-enabling region and the position of the point in the movement-enabling region;
an environmental mapping section configured to generate an environmental map on the basis of the plane identified by the plane identification section;
a planning section configured to plan a movement route on the basis of the environmental map generated by the environmental mapping section; and
a control section configured to control an operation of the mobile object on the basis of the movement route planned by the planning section.

REFERENCE SIGNS LIST

11 Mobile object, 12 Obstacle, 21 Polarization camera, 22 Laser ranging sensor, 31 Road surface, 32, 32-1, 32-2 Three-dimensional structure, 33 Sky, 34 Person, 51 Boundary pixel (pixel), 61 Intersection point (point), 61-1, 61-2, 62 Intersection point group, 102 Data acquisition section, 110 Automated driving control section, 141 Mobile object outside information detection section, 152 State recognition section, 301 Three-dimensional distance measurement section, 302 Coordinate system integration section, 303 Normal line detection section, 304 Road surface plane normal line detection section, 305 Image reconstruction section, 306 Semantic segmentation section, 321 Environmental mapping section, 351 Ranging section, 352 Light projection section, 353 Light reception section

The invention claimed is:

1. An information processing apparatus comprising:
a polarization camera configured to acquire polarized images in a plurality of polarizing directions,
circuitry configured to:
detect a normal direction of a plane constituting a movement-enabling region for a mobile object on a basis of the polarized images;
identify a position of a point on the plane constituting the movement-enabling region; and
recognize the plane constituting the movement-enabling region on a basis of the normal direction of the movement-enabling region and the position of the point in the movement-enabling region,
wherein the detecting the normal direction of the plane constituting the movement-enabling region for the mobile object on the basis of the polarized images comprises:
detecting, in units of pixels, a normal direction of a surface of a subject in the polarized images before outputting the detected normal direction as a normal vector map;
reconstructing an unpolarized image from the polarized images; and
setting an attribute of the subject to each of the pixels in the unpolarized image,
wherein
the circuitry detects a dominant normal direction on the normal vector map corresponding to a region having those pixels in the unpolarized image of which the attribute is set to the movement-enabling region, the dominant normal direction being the normal direction of the plane constituting the movement-enabling region, and
wherein the subject is semantically labelled as a road surface, an obstacle, or sky.

2. The information processing apparatus according to claim 1, wherein
the circuitry sets, through semantic segmentation, the attribute of the subject to each of the pixels in the unpolarized image.

3. The information processing apparatus according to claim 1, wherein
the circuitry is further configured to generate an environmental map on a basis of information regarding the attribute of the subject set to each of the pixels in the unpolarized image and information regarding the plane identified by the plane identification section.

4. The information processing apparatus according to claim 3, wherein,
given the information regarding the attribute of the subject set to each of the pixels in the unpolarized image, the circuitry generates the environmental map on a basis of information regarding the pixels of which the attribute is set to the movement-enabling region and information regarding the pixels of which the attribute is set to an obstacle, the environmental map being indicative of a position of the obstacle on the plane constituting the movement-enabling region.

5. The information processing apparatus according to claim 4, wherein,
given the information regarding the attribute of the subject set to each of the pixels in the unpolarized image, the circuitry generates the environmental map by taking the position on the plane constituting the movement-enabling region and corresponding to a boundary pixel in a vertically downward direction between the region of the pixels of which the attribute is set to the movement-enabling region on one hand and the region of the pixels of which the attribute is set to the obstacle on the other hand, as the position of the obstacle on the plane constituting the movement-enabling region.

6. The information processing apparatus according to claim 3, wherein
the environmental map is an occupancy grid map.

7. The information processing apparatus according to claim 1, wherein
the circuitry is further configured to integrate a coordinate system indicative of the position of the point identified by the circuitry in the movement-enabling region with a coordinate system of the polarized images acquired by the polarization camera.

8. The information processing apparatus according to claim 1, further comprising:
a ranger configured to measure a distance to a point in the movement-enabling region, wherein
the circuitry is configured to identify the position of the point in the movement-enabling region on a basis of the distance, measured by the ranger, to the point in the movement-enabling region.

9. The information processing apparatus according to claim 8, wherein
the ranger includes a laser ranging sensor, a stereo camera, or a millimeter-wave radar.

10. The information processing apparatus according to claim 1, wherein
the movement-enabling region includes a road surface.

11. An information processing method comprising the steps of:
acquiring polarized images in a plurality of polarizing directions;
detecting, on a basis of the polarized images, a normal direction of a plane constituting a movement-enabling region for a mobile object;
identifying a position of a point in the movement-enabling region; and
recognizing the plane constituting the movement-enabling region on a basis of the normal direction of the movement-enabling region and the position of the point in the movement-enabling region,
wherein the detecting the normal direction of the plane constituting the movement-enabling region for the mobile object on the basis of the polarized images comprises:
detecting, in units of pixels, a normal direction of a surface of a subject in the polarized images before outputting the detected normal direction as a normal vector map;
reconstructing an unpolarized image from the polarized images; and
setting an attribute of the subject to each of the pixels in the unpolarized image, wherein
a dominant normal direction on the normal vector map corresponding to a region having those pixels in the unpolarized image of which the attribute is set to the movement-enabling region is detected, the dominant normal direction being the normal direction of the plane constituting the movement-enabling region, and
wherein the subject is semantically labelled as a road surface, an obstacle, or sky.

12. A non-transitory computer readable memory device that includes instructions that when executed by a processor cause the processor to perform a method, the method comprising:
acquiring polarized images in a plurality of polarizing directions;
detecting, on a basis of the polarized images, a normal direction of a plane constituting a movement-enabling region for a mobile object;
identifying a position of a point on the plane constituting the movement-enabling region; and
recognizing the plane constituting the movement-enabling region on a basis of the normal direction of the movement-enabling region and the position of the point in the movement-enabling region,
wherein the detecting the normal direction of the plane constituting the movement-enabling region for the mobile object on the basis of the polarized images comprises:
detecting, in units of pixels, a normal direction of a surface of a subject in the polarized images before outputting the detected normal direction as a normal vector map;
reconstructing an unpolarized image from the polarized images; and
setting an attribute of the subject to each of the pixels in the unpolarized image, wherein
a dominant normal direction on the normal vector map corresponding to a region having those pixels in the unpolarized image of which the attribute is set to the movement-enabling region is detected, the dominant normal direction being the normal direction of the plane constituting the movement-enabling region, and
wherein the subject is semantically labelled as a road surface, an obstacle, or sky.

13. A mobile object comprising the information processing apparatus of claim 1.

* * * * *